(12) United States Patent
Färber

(10) Patent No.: US 7,950,733 B2
(45) Date of Patent: May 31, 2011

(54) MECHANISM FOR AN ADJUSTABLE BODY COMPONENT OF A VEHICLE

(75) Inventor: Manfred Färber, Wielenbach (DE)

(73) Assignee: Webasto AG, Stockdorf (DE)

(*) Notice: Subject to any disclaimer, the term of this patent is extended or adjusted under 35 U.S.C. 154(b) by 0 days.

(21) Appl. No.: 12/863,157

(22) PCT Filed: Jan. 5, 2010

(86) PCT No.: PCT/EP2010/000012
§ 371 (c)(1),
(2), (4) Date: Aug. 4, 2010

(87) PCT Pub. No.: WO2010/089008
PCT Pub. Date: Aug. 12, 2010

(65) Prior Publication Data
US 2011/0012391 A1    Jan. 20, 2011

(30) Foreign Application Priority Data

Feb. 9, 2009  (DE) .................... 10 2009 008 117
Jul. 31, 2009  (DE) .................... 10 2009 035 508

(51) Int. Cl.
*B60J 7/05* (2006.01)
(52) U.S. Cl. .................. 296/221; 296/222; 296/223
(58) Field of Classification Search .............. 296/221, 296/222, 223, 216.03, 216.05
See application file for complete search history.

(56) References Cited

U.S. PATENT DOCUMENTS

| 6,419,310 B1* | 7/2002 | Manders | 296/223 |
| 7,025,414 B2* | 4/2006 | Hanke | 296/221 |
| 7,644,980 B2* | 1/2010 | Hager et al. | 296/223 |
| 2005/0017547 A1* | 1/2005 | Wingen | 296/216.03 |

FOREIGN PATENT DOCUMENTS

| DE | 34 17098 A1 | 11/1985 |
| DE | 39 30 756 A1 | 3/1991 |
| DE | 10 2007 021 005 A1 | 12/2008 |
| EP | 2 017 108 A1 | 1/2009 |
| WO | WO 03/024730 A2 | 3/2003 |

OTHER PUBLICATIONS

International Search Report dated Feb. 24, 2010.

* cited by examiner

*Primary Examiner* — Dennis H Pedder
(74) *Attorney, Agent, or Firm* — Fitch, Even, Tabin & Flannery; John M. Naber

(57) ABSTRACT

The invention relates to a mechanism for generating pivot motions and displacement motions of a chassis component (30), having a displaceable carriage (40) engaging with at least one first guide element (361) disposed on the chassis component by means of at least one second guide element (42, 44, 46). In order to simplify the mechanism according to the invention, the displaceable carriage (40) has at least two second guide elements (42, 44, 46) acting together with the first guide element (361) in the closed position and during the pivot motion of the chassis component (30), and acting together with a further first guide element (362) associated with the chassis component (30) during a displacement motion of the chassis component (30). The invention is in particular suitable for the panel of a sliding tilting sunroof of a vehicle.

15 Claims, 19 Drawing Sheets

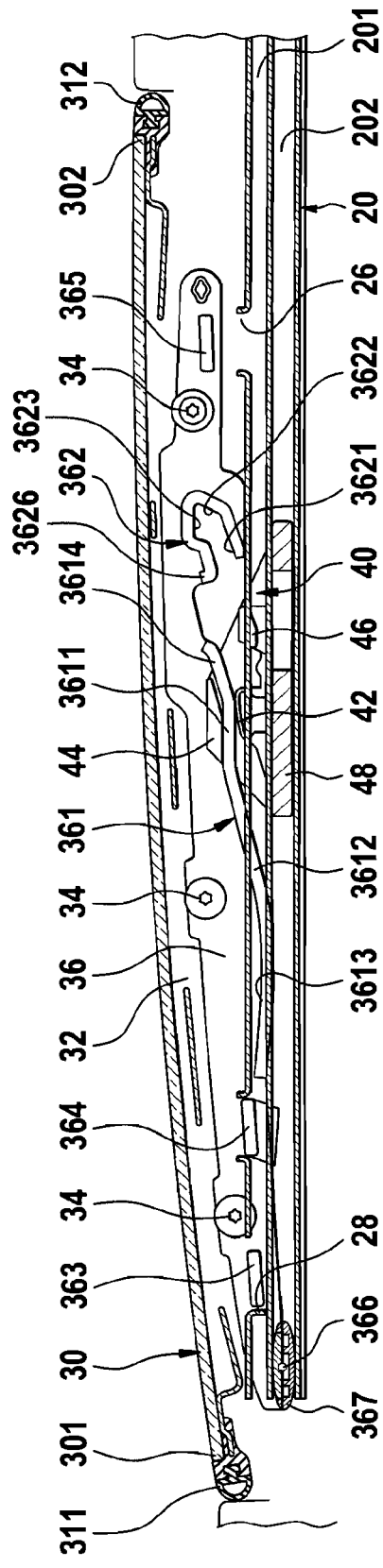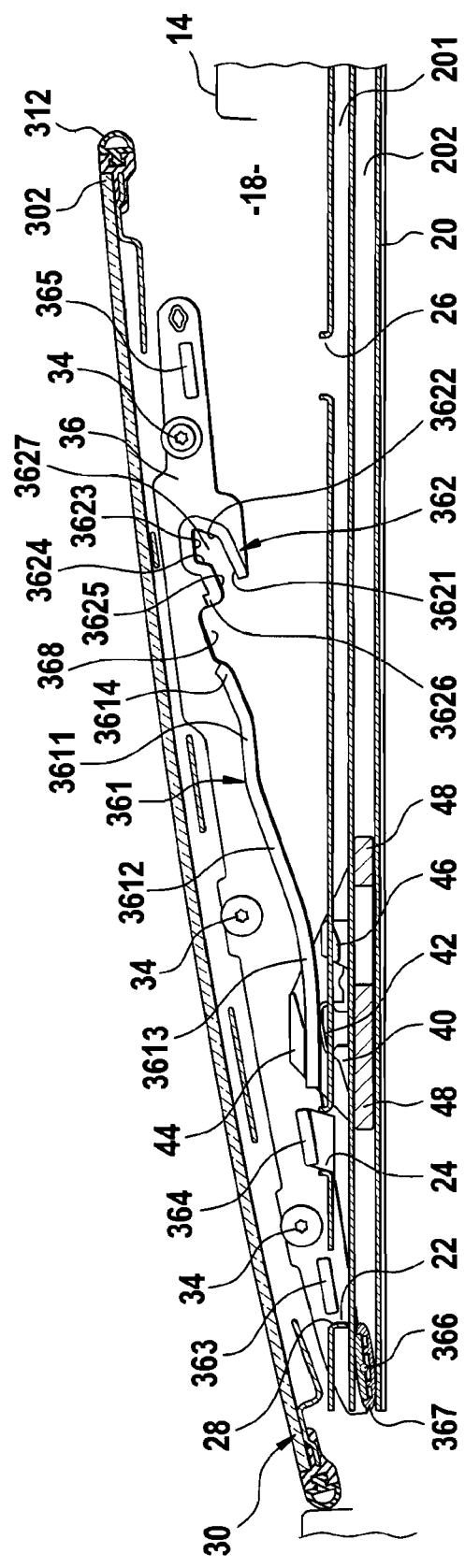
Fig. 2
Fig. 3

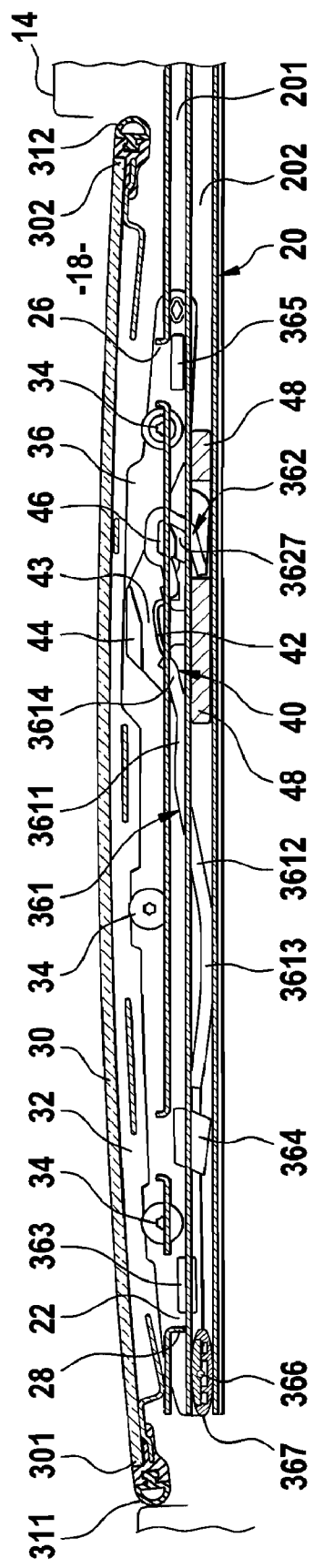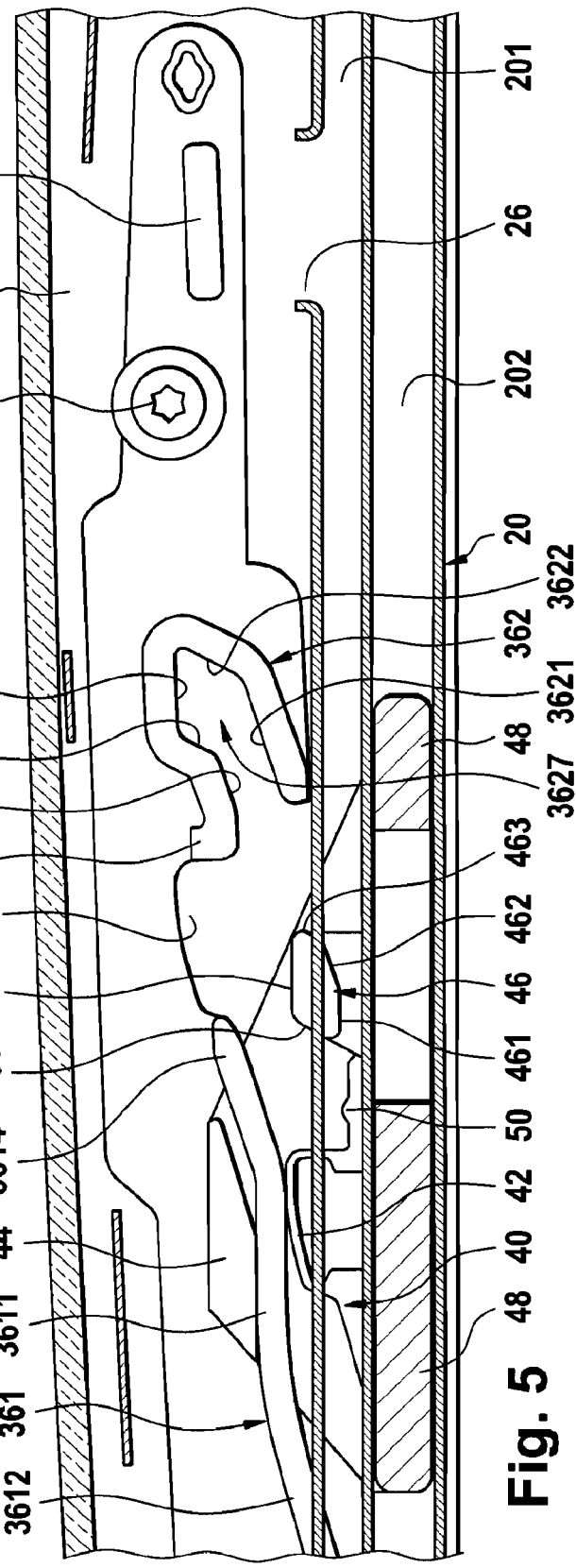
Fig. 4
Fig. 5

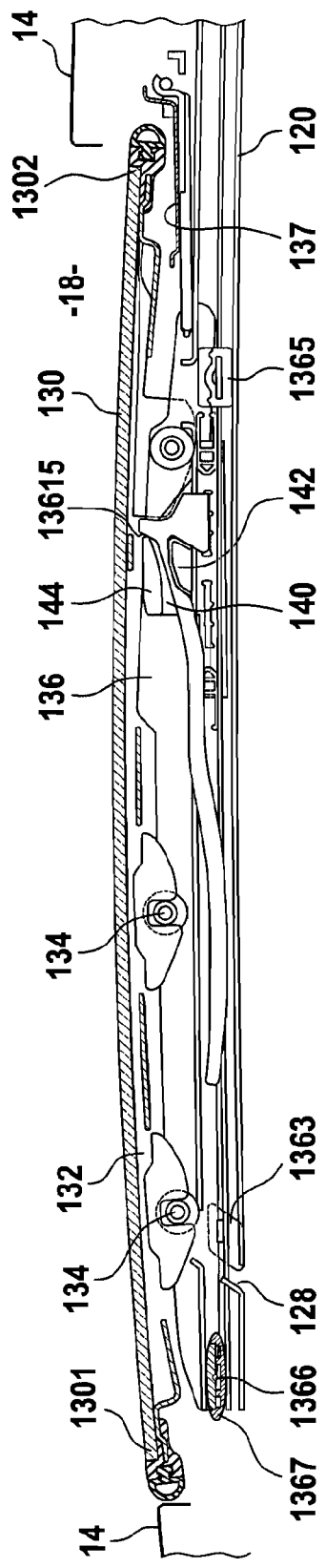
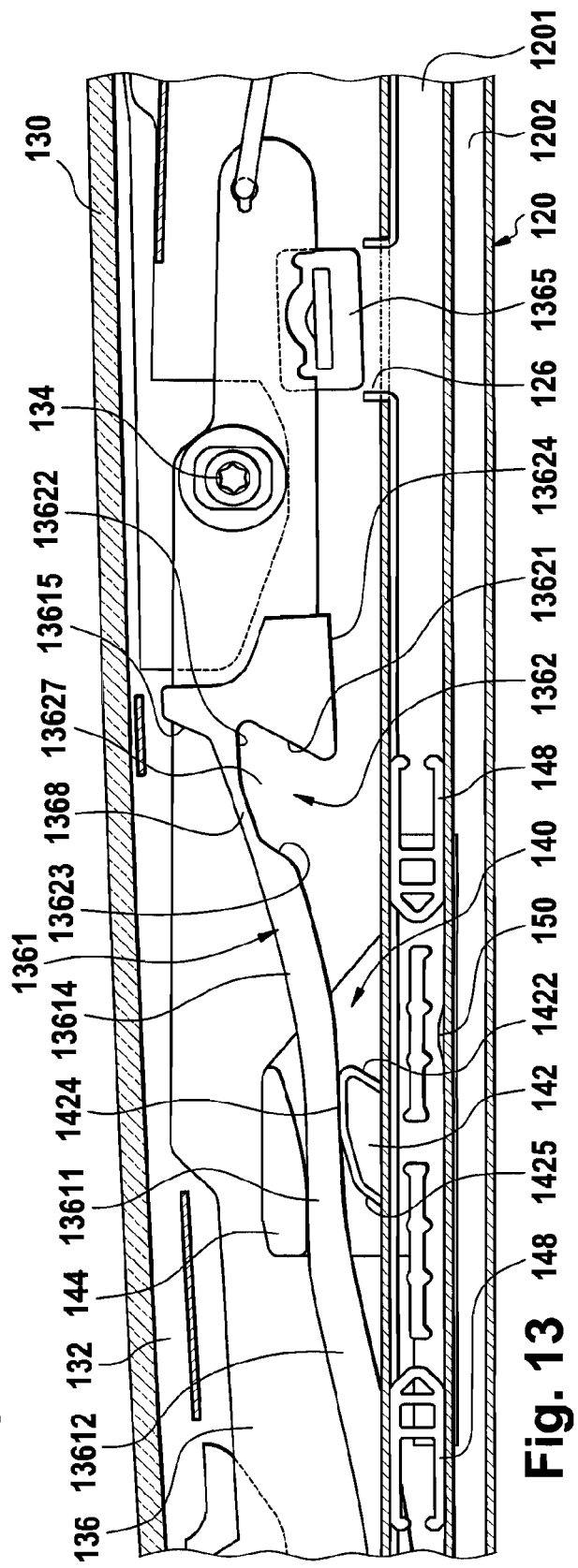
Fig. 12
Fig. 13

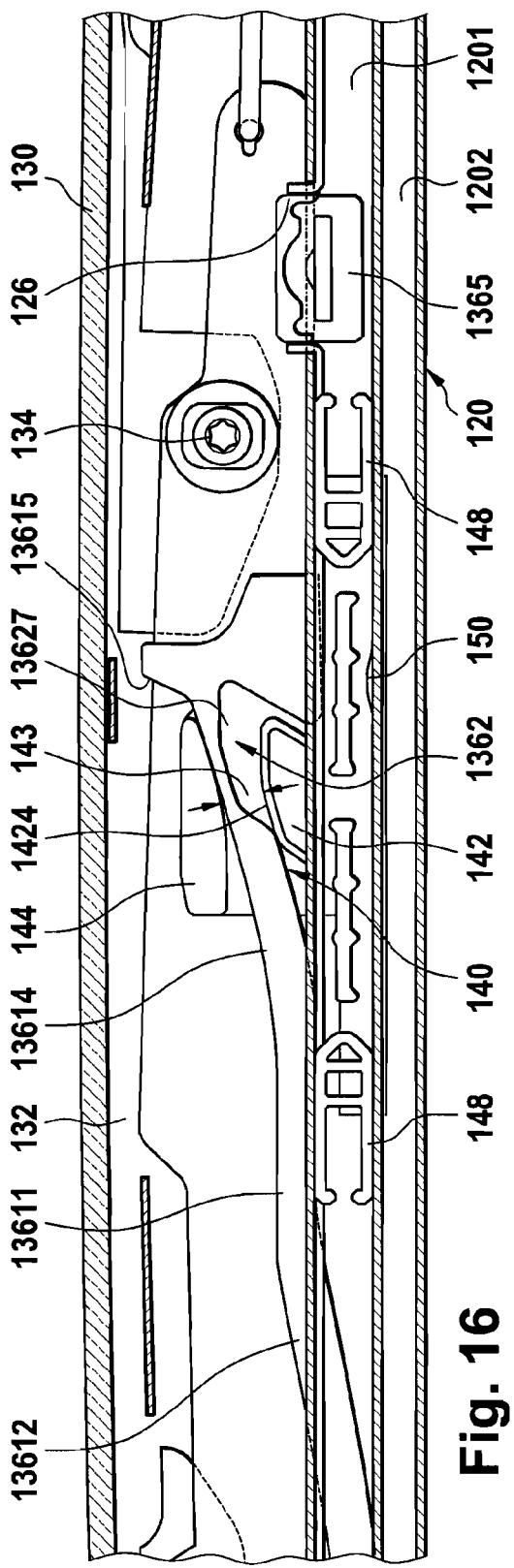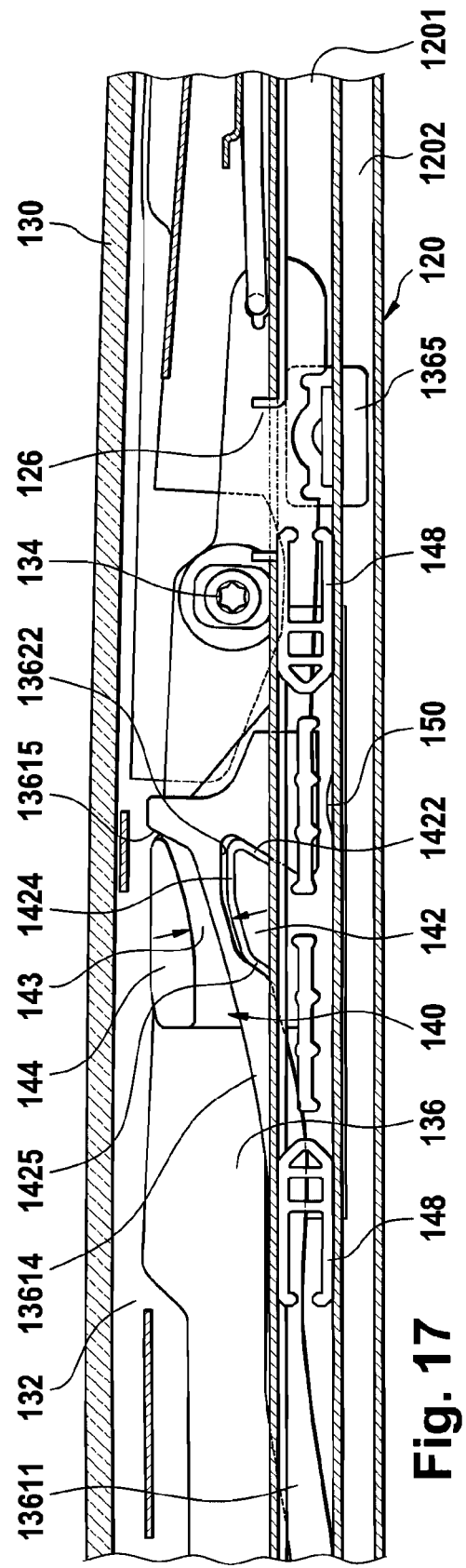

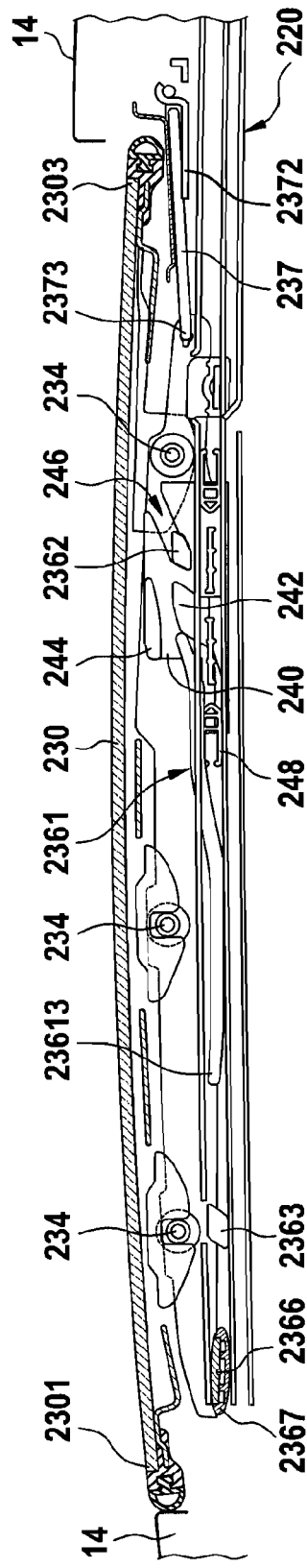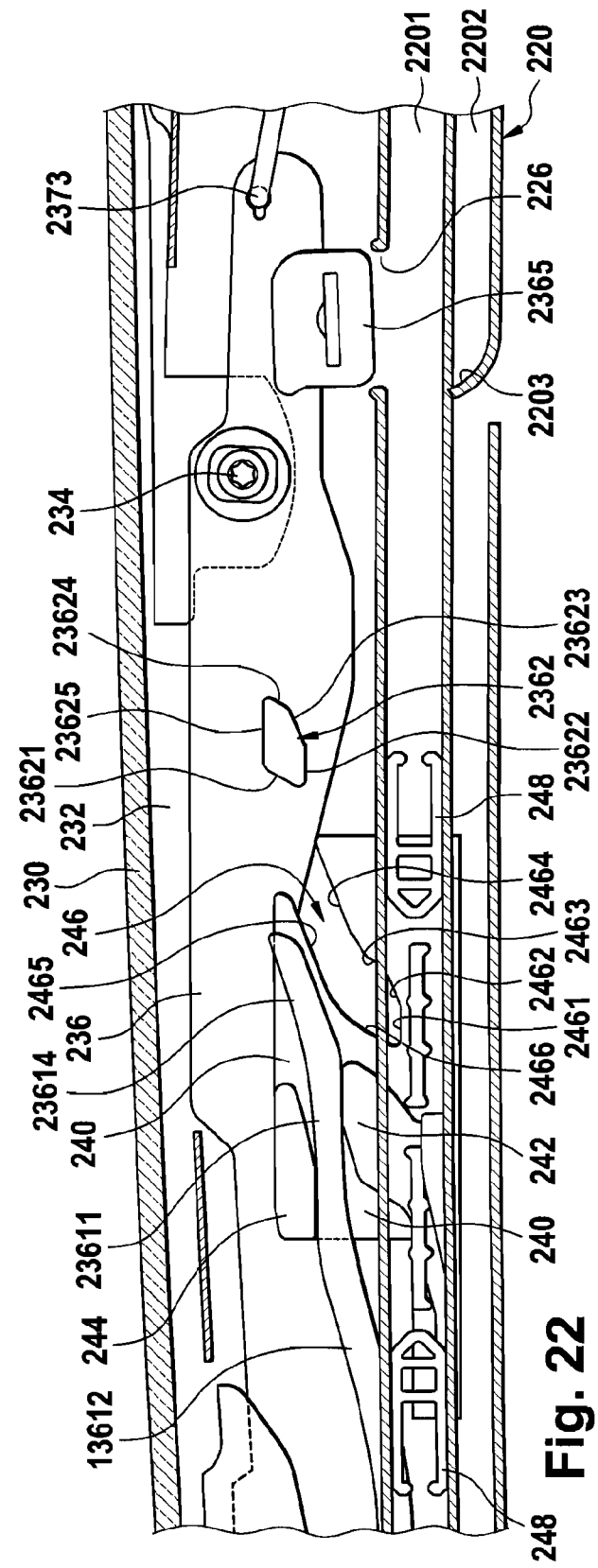

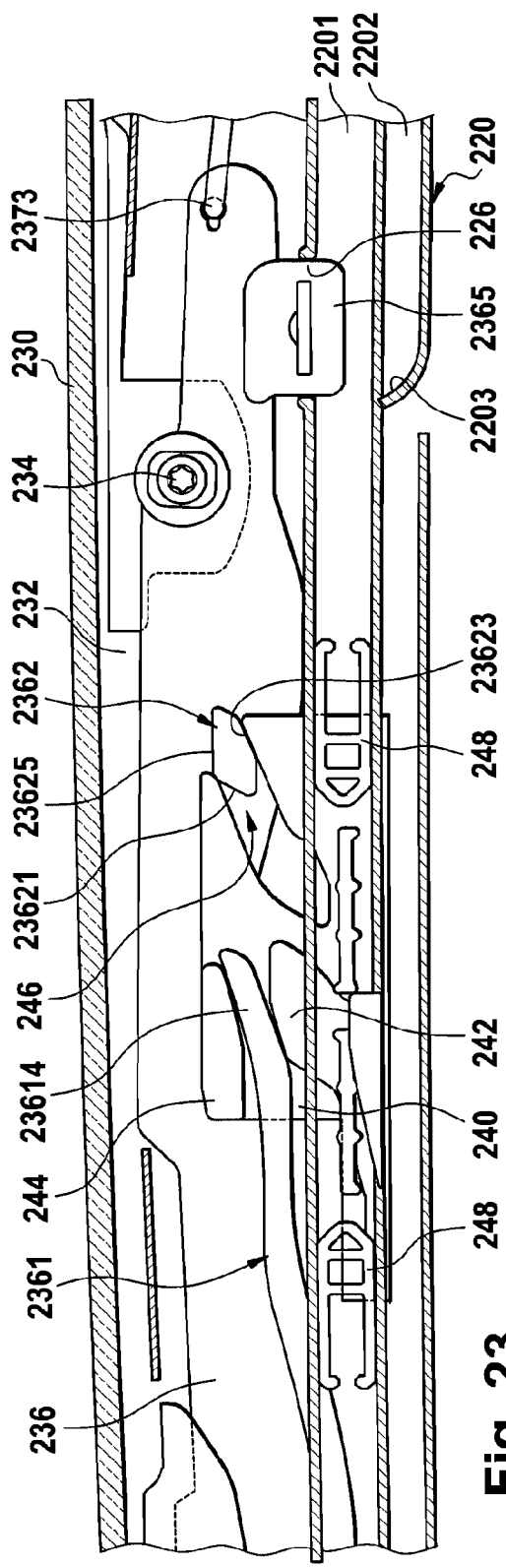
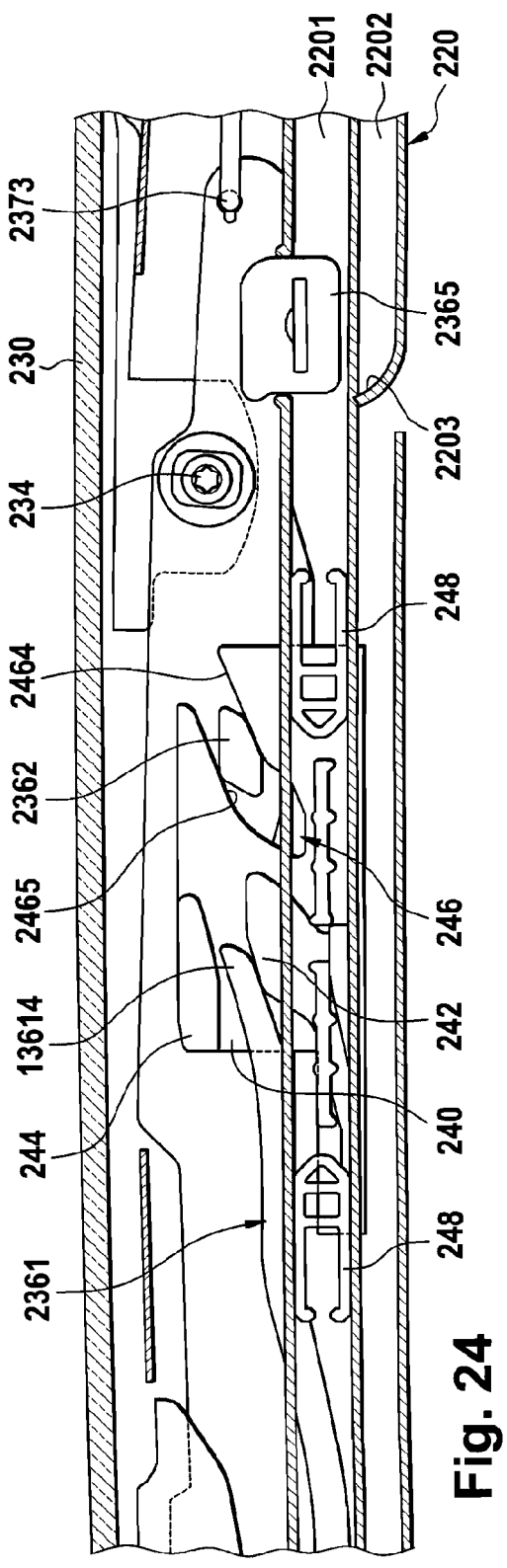
Fig. 23
Fig. 24

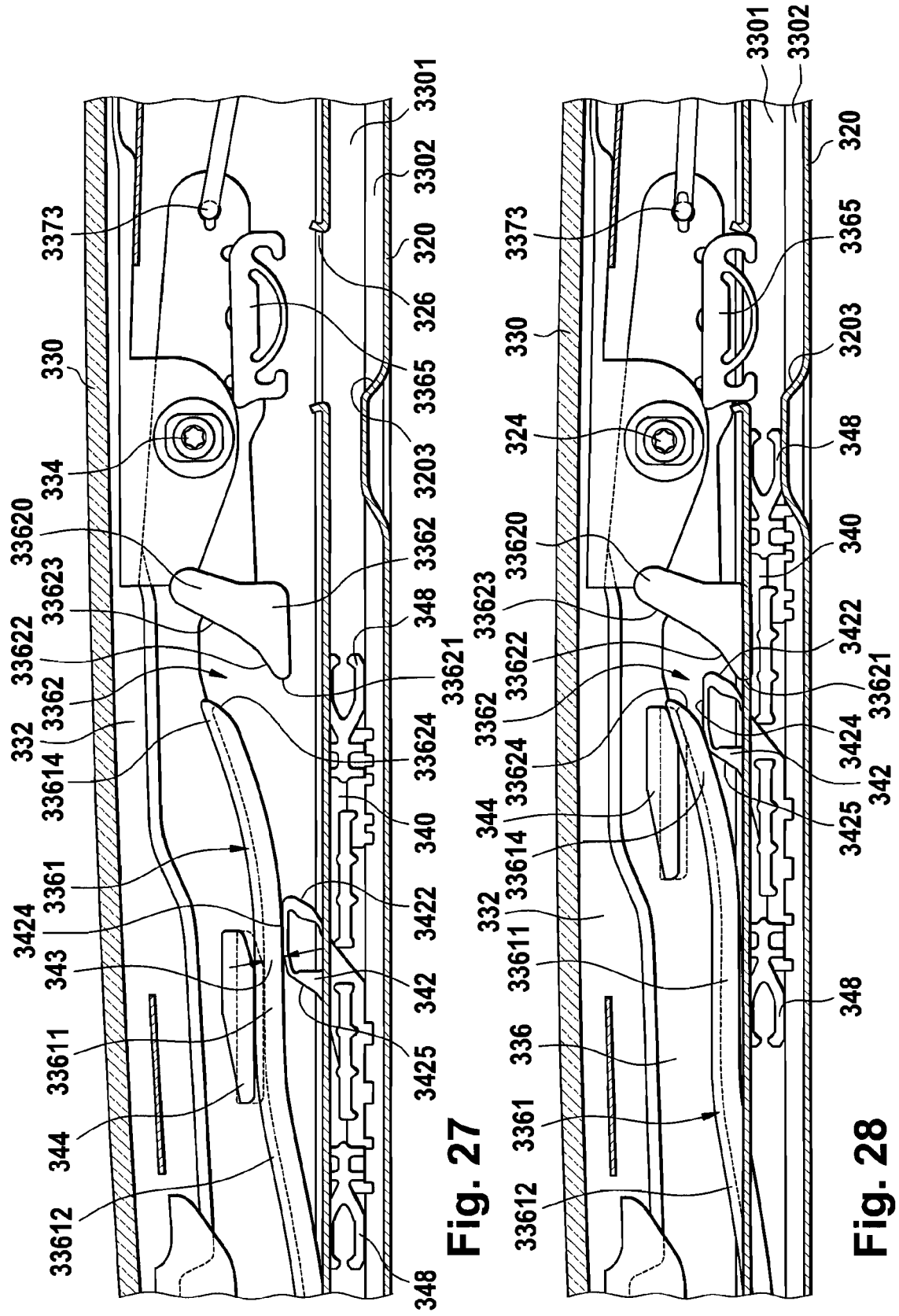

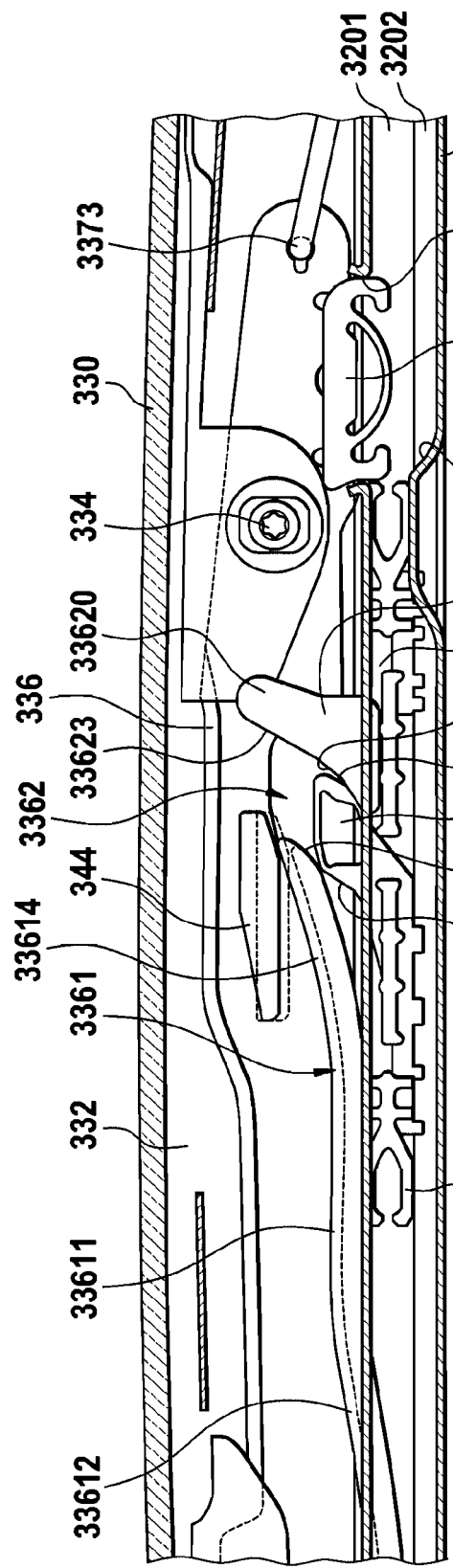
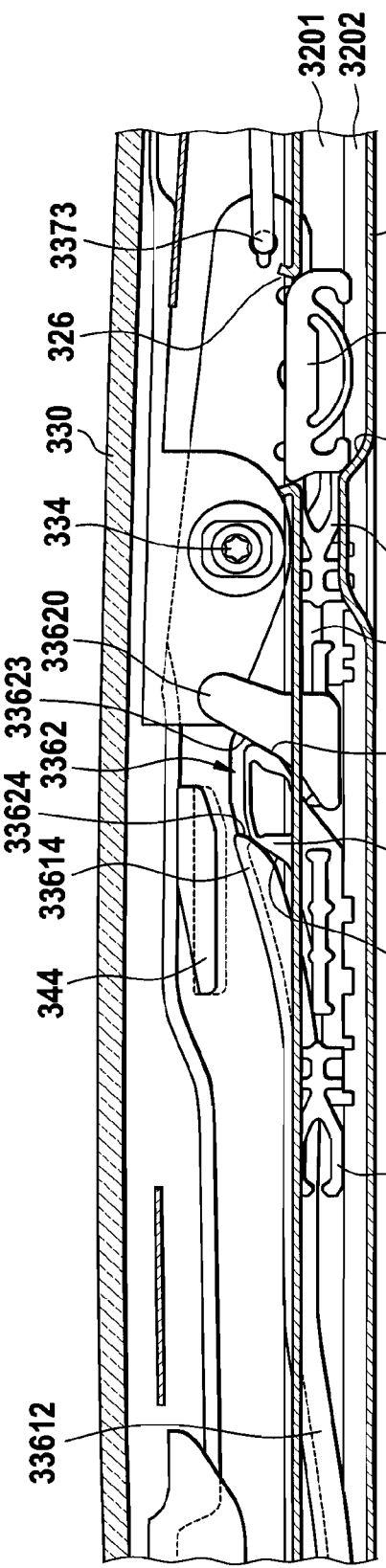
Fig. 29
Fig. 30

MECHANISM FOR AN ADJUSTABLE BODY COMPONENT OF A VEHICLE

CROSS-REFERENCE TO RELATED APPLICATIONS

This Application is a U.S. national phase application filed under 35 U.S.C. §371 of International Application No. PCT/EP2010/000012, filed Jan. 5, 2010, designating the United States, which claims priority from German Patent Application Nos.: DE 10 2009 008 117.8, filed Feb. 9, 2009 and DE 10 2009 035 508.1, filed Jul. 31, 2009, which are hereby incorporated herein by reference in their entirety for all purposes.

The invention relates to a mechanism for an adjustable body component of a vehicle according to the precharacterizing clause of patent claim 1.

The invention is useable for actuating vehicle body components which can execute a displacement movement in addition to a pivoting movement. Said mechanisms may be, for example, actuating mechanisms for covers of tilt and slide roofs or for pivoting and sliding doors or for covering flaps. To date, actuating mechanisms for covers of tilt and slide roofs generally have at least one additional pivot lever in addition to a driving slide which is displaceable on guide rails and guide tracks which are arranged on a moveable cover.

A body component designed as a cover of a tilt and slide roof is known from DE 39 30 756 C2, in which, to open the cover which, in the closed position, closes a roof opening, said cover can either be deployed with the rear edge thereof over the fixed vehicle roof into a ventilation position by pivoting about a pivot axis arranged in the vicinity of the front edge or, after the rear edge thereof is lowered, can be displaced to the rear under the fixed vehicle roof in order to expose the roof opening. In order to secure the cover with the pivot axis thereof in a defined position during the pivoting movement into the ventilation position or when being lowered into the closed position or into the initial position prior to the beginning of the sliding movement and in order to prevent premature displacement, the mechanism of the cover is provided with a special locking element which is independent of the tilting and sliding mechanism.

The invention is based on the object of providing a simplified mechanism for an adjustable body component, in particular for a cover of a tilt and slide roof.

This object is achieved according to the invention by the features of the patent claims. Advantageous refinements of the invention are indicated in the dependent claims.

The invention essentially makes provision for the mechanism for tilting and sliding the body component, which mechanism is formed as a tilting and sliding mechanism, to have a displaceable slide which is provided with at least two second guide elements which interact with first guide elements (web guides) assigned to the body component in certain movement sections (preferably in the closed position and during the pivoting movements) and which interact with another first guide element (control slot or control cam) assigned to the body component in another movement section (preferably upon sliding displacement of the body component).

Therefore, in the simplest case, only two components are required for the tilting and sliding mechanism of the body component and for the locking: a single-part slide with the second guide elements arranged thereon, and a cover slot on which a web guide and a control slot or control cam are arranged as the first guide elements. As an alternative, however, the web guide and the control slot may also be composed of a plurality of components in order to simplify the production or in order to permit various body components to be useable in a modular manner. In the subject matter of the invention, the at least one locking element together with the guide elements of the tilting and sliding mechanism is directly actuated by the sliding movement of the driving slide in a manner free from additional levers as have been required to date.

The terms "mechanism" or "tilting and sliding mechanism" cover the slide which is preferably designed as a driving slide, and the first and second guide elements.

According to an embodiment which is advantageous for all of the exemplary embodiments, provision is made for the at least one locking element to be arranged together with the first guide elements on a component assigned to the body component. The component assigned to the body component is preferably formed by a carrier which is preferably formed as an injection molded plastics part or as a composite component of one or more plates with an at least partial insert molding made of plastic. The web guide, the locking elements and, in three of four exemplary embodiments, also the control slot are preferably formed integrally on the carrier. As a rule, a carrier of this type is in each case arranged on both sides of the body component symmetrically with respect to a central longitudinal plane.

According to a further refinement which is advantageous for all of the exemplary embodiments, provision is made for the driving slide to preferably be formed integrally with a lower second guide element which engages around the web guide from below and with an upper second guide element which engages around the web guide from above.

According to a further—the third—exemplary embodiment, a control slot which interacts with a control cam on the carrier is also designed as a further second guide element on the slide. The second guide elements can be produced cost-effectively, for example during production of the slide in the form of an injection molded plastics part or as a composite component of one or more sheets with an at least partial insert molding made of plastic.

According to a further refinement of the invention, provision is made for some of the second guide elements to become disengaged from the web guide at the earliest when at least one second guide element is in engagement with another first guide element. This ensures a sliding transfer and consistently stable, definite support of the body component during the pivoting movement thereof and during the sliding movement thereof.

According to a further advantageous refinement of the invention (in the first, the third and the fourth embodiment), provision is made for a gap to be provided in the longitudinal direction between the first guide elements (web guide and control slot or control cam). Said gap forms a spacing between the web guide and control slot, in which the lower second guide element and/or the upper second guide element are/is located while at least one of the second guide elements is in engagement with a first guide element on the body component upon a sliding movement of the body component. However, as an alternative thereto—as shown in the second exemplary embodiment—a continuous web guide can also be realized, under which the control slot is arranged or formed in the rear part. According to the fourth embodiment, two second guide elements are sufficient on the driving slide, said guide elements first of all (in the closed position or during pivoting movements of the body component) engaging around the web guide and of which the lower second guide element is placed onto a guide surface of a slot for sliding displacement of the body component.

Provision is preferably furthermore made for the locking element to be formed by at least one, preferably by two or more control webs which are spaced apart from one another in the longitudinal direction and each interact with a recess in the guide rail. The transition between pivoting movement and displacement movement can be even better controlled by the plurality of control webs. In this case, at least one front control web is preferably arranged in front of the front first guide element and at least one rear control web behind the rear first guide element. The control webs are preferably formed integrally together with the first guide elements on the carrier.

A mechanism according to the invention is explained in more detail below by way of the example of a body component which is formed by a cover of a tilt and slide roof of a vehicle, and using four exemplary embodiments with reference to the drawing, in which:

FIG. 2 shows a schematic longitudinal section according to the section line II-II in FIG. 1 through the mechanism and the guide of the cover of a first exemplary embodiment when the vehicle roof is closed;

FIG. 3 shows a schematic longitudinal section through the mechanism and the guide of the cover of the first exemplary embodiment when the cover is tilted into a ventilation position;

FIG. 4 shows a schematic longitudinal section through the mechanism and the guide of the cover of the first exemplary embodiment when the cover is lowered at the rear edge thereof;

FIG. 5 shows an enlarged detailed view of the rear part of the mechanism of the cover of the first exemplary embodiment when the vehicle roof is closed;

FIG. 12 shows a schematic longitudinal section through the mechanism and the guide of the cover of the second exemplary embodiment when the cover is lowered at the rear edge thereof;

FIG. 13 shows an enlarged detailed view of the rear part of the mechanism of the cover of the second exemplary embodiment when the vehicle roof is closed;

FIG. 16 shows an enlarged detailed view of the rear part of the mechanism of the cover of the second exemplary embodiment as the lowering movement of the cover rear edge progresses further;

FIG. 17 shows an enlarged detailed view of the rear part of the mechanism of the cover of the second exemplary embodiment as the lowering movement of the cover rear edge progresses even further;

FIG. 21 shows a schematic longitudinal section through the mechanism and the guide of the cover of the third exemplary embodiment when the cover is lowered at the rear edge thereof;

FIG. 22 shows an enlarged detailed view of the rear part of the mechanism of the cover of the third exemplary embodiment when the vehicle roof is closed;

FIG. 23 shows an enlarged detailed view of the rear part of the mechanism of the cover of the third exemplary embodiment at the beginning of the lowering movement of the cover rear edge;

FIG. 24 shows an enlarged detailed view of the rear part of the mechanism of the cover of the third exemplary embodiment as the lowering movement of the cover rear edge progresses;

FIG. 27 shows an enlarged detailed view of the rear part of the mechanism of the cover of a fourth exemplary embodiment when the vehicle roof is closed;

FIG. 28 shows an enlarged detailed view of the rear part of the mechanism of the cover of the fourth exemplary embodiment at the beginning of the lowering movement of the cover rear edge;

FIG. 29 shows an enlarged detailed view of the rear part of the mechanism of the cover of the fourth exemplary embodiment as the lowering movement of the cover rear edge progresses;

Figure 31:
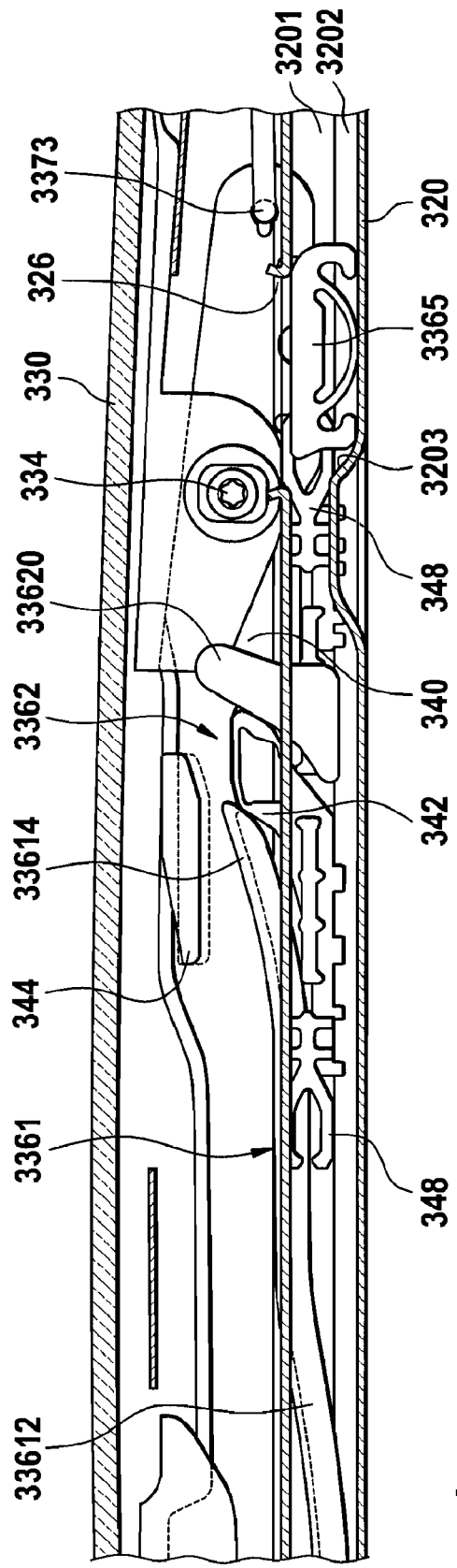

FIG. 30 shows an enlarged detailed view of the rear part of the mechanism of the cover of the fourth exemplary embodiment as the lowering movement of the cover rear edge progresses further; and FIG. 31 shows an enlarged detailed view of the rear part of the mechanism of the cover of the fourth when the lowering movement of the cover rear edge is completed and the sliding displacement of the cover begins.

Figure 1:
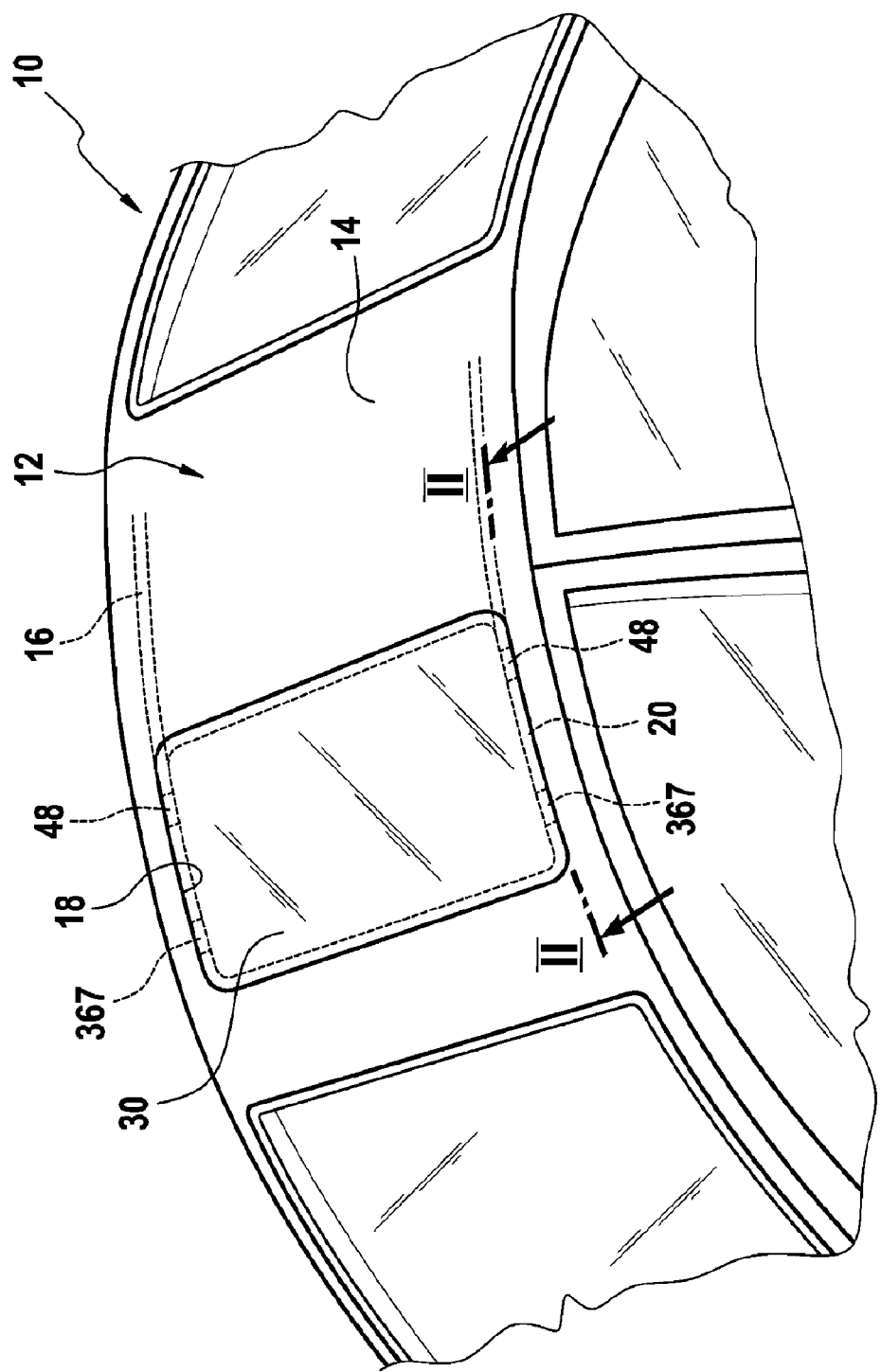
FIG. 1 shows a schematic perspective partial view of a vehicle.

The vehicle 10 shown in FIG. 1 has a vehicle roof 12 in which a roof opening 18 is formed. The roof opening 18 can be closed by means of a cover 30 (see FIG. 1) or can be at least partially exposed by the rear edge 302 of the cover 30 being tilted into a ventilation position (see FIG. 3) or by the rear edge 302 being lowered (see FIG. 4) and subsequently displaced under a fixed roof region 14 of the vehicle roof 12, which roof region is arranged behind the roof opening 18. The cover 30 serves as an example of the body component which is moveable by means of the mechanism according to the invention.

The cover 30 has a seal 311 at the front edge 301 thereof and a seal 312 at the rear edge 302 thereof, by means of which water is prevented from penetrating the roof opening 18 when the cover 30 is closed.

The cover 30 is mounted on a roof frame 16 which is arranged below the fixed vehicle roof 12, surrounds the borders of the roof opening 18 and extends to the rear under the fixed roof region 14. Guide rails 20, in which the mechanism of the cover 30 is slidably mounted, which mechanism is described in detail below only for one side of the vehicle, are arranged on the roof frame 16 on both sides of the roof opening 18 parallel to the side rails of the vehicle 10. The same arrangement is present symmetrically with respect to a central longitudinal plane of the vehicle roof on the other side of the vehicle. The same also applies to the other exemplary embodiments described further below.

The guide rail 20 has an upper guide track 201 and a lower guide track 202. A first recess 22, a second recess 24 and a third recess 26 are provided spaced apart from one another from the front to the rear in the longitudinal direction of the vehicle in the upper web of the upper guide track 201. The recesses 22, 24 and 26 serve to receive locking elements which are designed as control webs 363, 364 and 365 and that are arranged on a carrier designed as a cover carrier 36. In the closed position and in the ventilation position of the cover 30, the control webs 363 and 364 are in engagement with the recesses 22 and 24 respectively assigned thereto (see FIGS. 2 and 3) and, as a result, prevent displacement of the cover 30 during the pivoting movement thereof. When the rear edge 302 of the cover 30 is lowered, the rear control web 365 dips through the rear recess 26 and enters the upper guide track 201 (see FIGS. 8 and 9). A stop 28 is provided at the front end of the front recess 22, said stop being angled downward into the upper guide track 201 and the front control web 363 strikes against said stop during a displacement in the closing direction of the cover 30.

The cover carrier 36 is connected by means of three fastening points 34, for example by screws, to a cover inner plate 32 arranged on the cover 30. Essential parts of the actuating mechanism of the cover 30 are also arranged on the cover carrier 36. The actuating mechanism of the cover 30 has two first guide elements 361 and 362 which are formed here by a web guide 361 and a control slot 362 arranged behind said web guide at a distance therefrom. The first guide elements (web guide 361 and control slot 362) are actuated by three second guide elements 42, 44, 46 which are arranged on a driving slide 40. The slide which is designed as a driving slide 40 is in engagement with the lower guide track 202 of the guide rail 20 by means of sliding elements 48. Said slide is displaced in the lower guide track 202 of the guide rail 20 by a drive (not illustrated) by means of a flexible driving cable guided in a manner resistant to extension and compression.

The web guide 361 is engaged around by a lower second guide element 42 at its lower side and by an upper second guide element 44 at its upper side. The lower second guide element 42 and the upper second guide element 44 form a guide gap 43 which approximately corresponds to the thickness of the web guide 361 such that the latter is surrounded with little play by the lower second guide element 42 and by the upper second guide element 44 in the form of a sliding guide in all movement phases relating to the closed position and pivoting movements of the cover 30.

In the closed position of the cover 30 according to FIG. 2, the web guide 361 is engaged around in a first substantially horizontal section 3611 by the second guide elements 42 and 44. The section 3611 is forwardly adjoined by a slightly obliquely forwardly dropping section 3612 of the web guide 361. Said section is forwardly adjoined by a third section 3613 which, in the exemplary embodiment, forms a slightly downwardly curved arc. The section 3612 serves to pivot the cover 30 into the ventilation position thereof. In the ventilation position, the cover 30 is supported in a stable manner by the third section 3613 of the web guide 361 (see FIG. 3).

Figure 6:
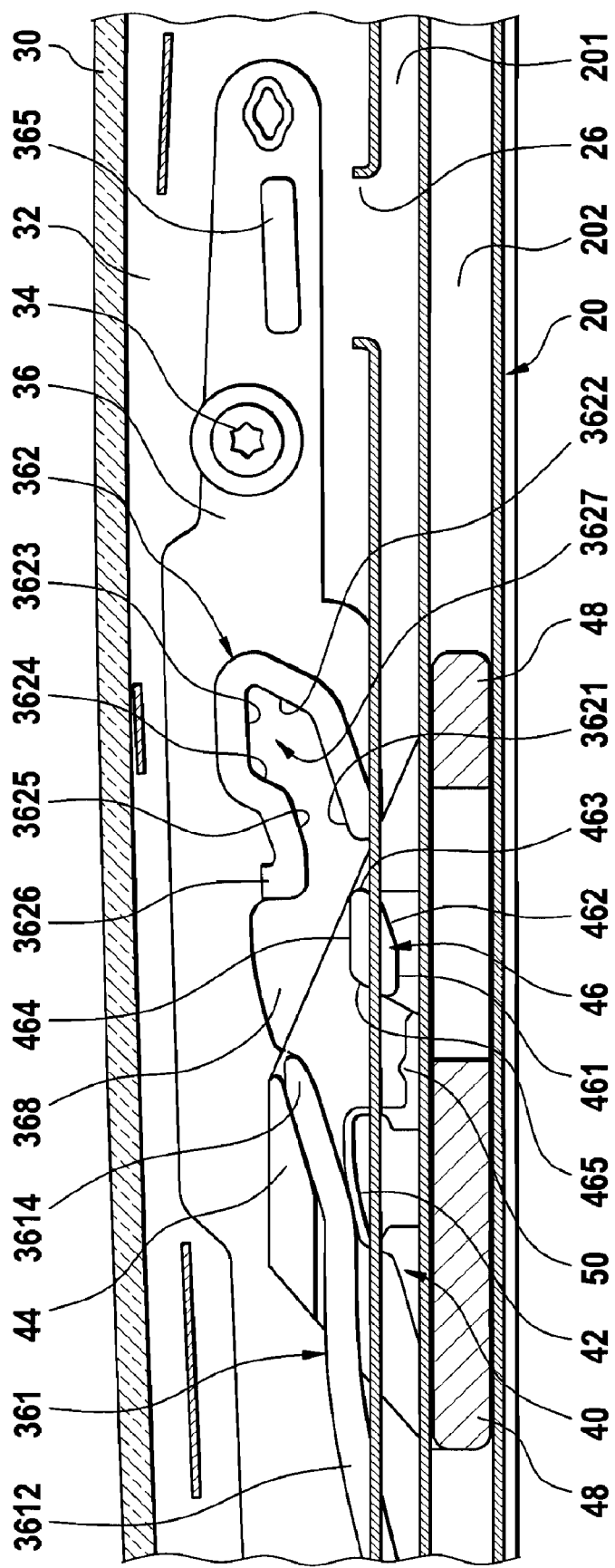
FIG. 6 shows an enlarged detailed view of the rear part of the mechanism of the cover of the first exemplary embodiment at the beginning of the lowering movement of the cover rear edge.

The first section 3611 is rearwardly adjoined by a slightly obliquely rising fourth section 3614 of the web guide 361. The fourth section 3614 serves to lower the rear edge 302 of the cover 30 (see FIGS. 6 to 8).

The rear end of the rear section 3614 of the web guide 361 is adjoined after a gap 368 by the control slot 362, which is likewise arranged on the cover carrier 36, as a further first guide element. Like the web guide 361, the control slot 362 can preferably also be formed integrally with the cover carrier 36. The control slot 362 is open forward at the bottom and is bordered by a slightly obliquely rising first section 3621 adjoining the opening to the rear, by an adjoining second section 3622 inclined more steeply upward, by an upper, third section 3623 running approximately horizontally, by an adjoining fourth section 3624 dropping obliquely forward, by a fifth section 3625 which forwardly adjoins the latter and drops slightly obliquely and by a sixth section 3626 which forwardly adjoins the latter and is curved upward approximately at a right angle. The first section 3621 and the fifth section 3625 are arranged substantially parallel to each other. The second section 3622 and the fourth section 3624 are likewise arranged substantially parallel to each other. The sections 3621 to 3625 of the control slot 362 define a receptacle 3627 of the control slot 362, which receptacle is open at the bottom obliquely forward and serves to receive the rear second guide element 46 which, like the lower second guide element 42 and the upper second guide element 44, is arranged on the slide 40 or preferably is formed integrally therewith.

The cover 30 is supported in the front region in the vicinity of the front edge 301 thereof by a front sliding element 367 which is arranged on the cover carrier 36, is guided in the lower guide track 202 of the guide rail 20 and defines a pivot axis 366 of the cover 30.

The lower side of the rear second guide element 46 has a first surface 461 which is approximately horizontal in the closed position of the cover 30 and is adjoined to the rear by a slightly obliquely rising surface 462 which is adjoined by a further surface 463 inclined more steeply upward. The rear second guide element 46 is upwardly bounded by a surface 464 which is approximately horizontal in the closed position of the cover 30 and is forwardly adjoined by a surface 456 dropping obliquely forward. The surfaces 463 and 465 are arranged substantially parallel to each other.

The upper surface 464 of the rear second guide element 46 is arranged somewhat below the upper top surface of the lower second guide element 42. A damping element 50 which is composed, for example, of a relatively soft plastic which is molded or adhesively bonded thereon is located between the lower second guide element 42 and the rear second guide element 46 in a region of the driving slide 40 on the surface thereof which faces the cover 30, which region is lowered with respect to the upper top surface 464. The damping element 50 serves to damp the downwardly moving cover 30 when the rear second guide element 46 fully enters the receptacle 3627 during the transition from FIG. 8 to FIG. 9. As can be seen in FIG. 9, the upper part of the fifth section 3625 of the control slot 362 abuts here from above onto said damping element 50.

A complete cycle of movement of the cover 30 is described below with reference to the drawings. In the closed position according to FIG. 2, the web guide 361 is engaged around in the first section 3611 thereof by the lower second guide element 42 and by the upper second guide element 44. The front control web 363 is located in the front recess 22 and the second control web 364 is located in the second recess 24 of the guide rail 20. As a result, the cover 30 is prevented from being displaced in the longitudinal direction.

In order to tilt the cover 30 at the rear edge 302 thereof into the ventilation position illustrated in FIG. 3, the driving slide 40 is moved forward along the guide rail 20 by a preferably electric drive (not shown) by means of a driving cable (not shown) which is fastened to the driving slide 40. Upon passing through the second section 3612 of the web guide 361, the lower second guide element 42 and the upper second guide element 44 move the cover 30 into the ventilation position. In said position, the lower second guide element 42 and the upper second guide element 44 engage around the third section 3613 of the web guide 361. Despite the tilted position of the cover 30, the front control web 363 still continues to be in engagement with the front recess 22 of the guide rail 20, and the second control web 364, which has a somewhat larger overall height, likewise continues to be in engagement with the second recess 24 of the guide rail 20. As a result, the cover 30 continues to be prevented from being displaced in the longitudinal direction. To lower the cover rear edge 302 into the closed position, the driving slide 40 moves again into the initial position in which the lower second guide element 42 and the upper second guide element 44 engage around the web guide 361 in the region of the first section 3611.

Figure 7:
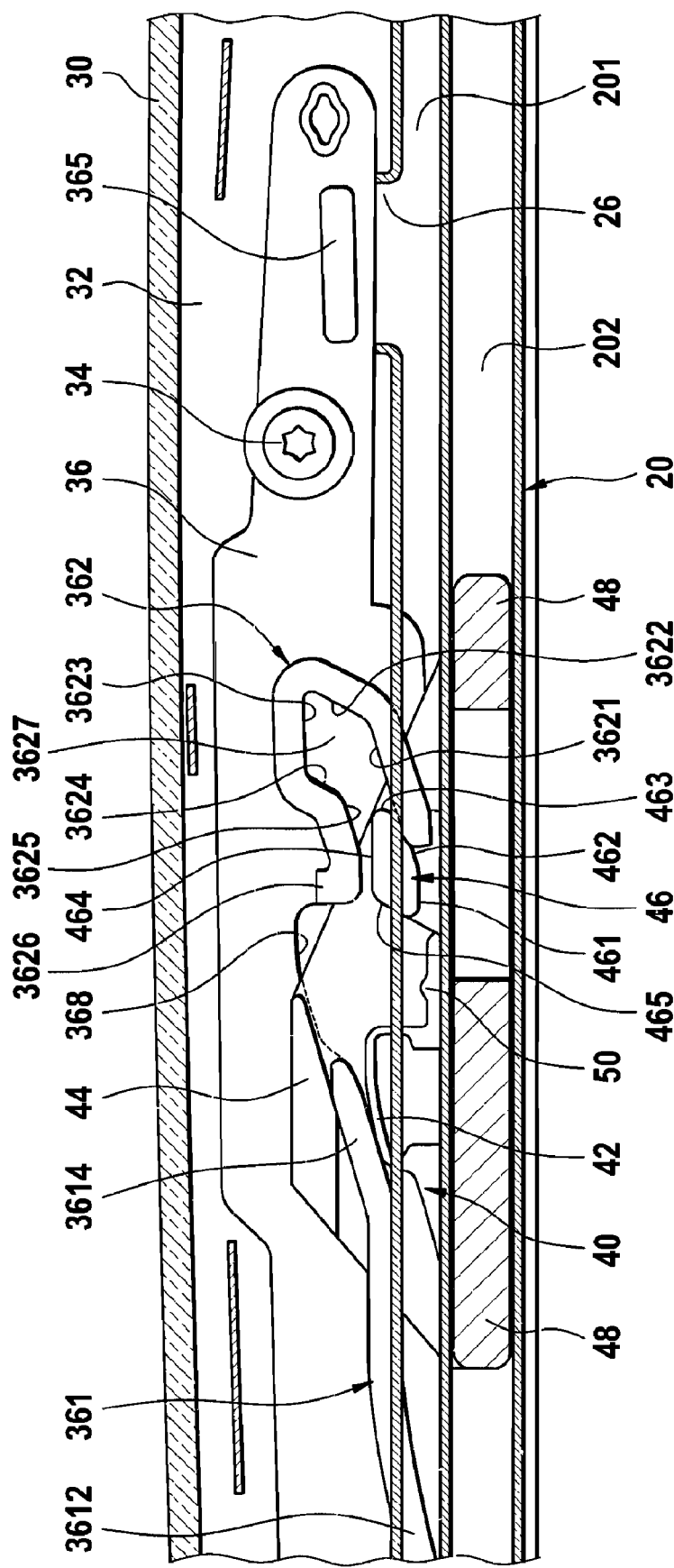
FIG. 7 shows an enlarged detailed view of the rear part of the mechanism of the cover of the first exemplary embodiment as the lowering movement of the cover rear edge progresses.

In order to lower the cover rear edge 302 downward below the level of the rear fixed roof region 14 of the vehicle roof 12, the driving slide 40 is moved to the rear starting from the closed position. In the process, the lower second guide element 42 and the upper second guide element 44 engage around the fourth section 3614 of the web guide 361 and pivot the cover 30 into a position tilted rearwardly downward about the pivot axis 366. When the lower second guide element 42 and the upper second guide element 44 approach the rear end of the web guide 361, the rear second guide element 46 approaches the control slot 362 at the same time. Even before the lower second guide element 42 and the upper second guide element 44 become disengaged from the rear end of the web guide 361, the rear second guide element 46 enters the control slot 362, wherein first of all the oblique surface 462 of said guide element slides onto the oblique first section 3621 of the control slot (FIG. 7).

Figure 8:
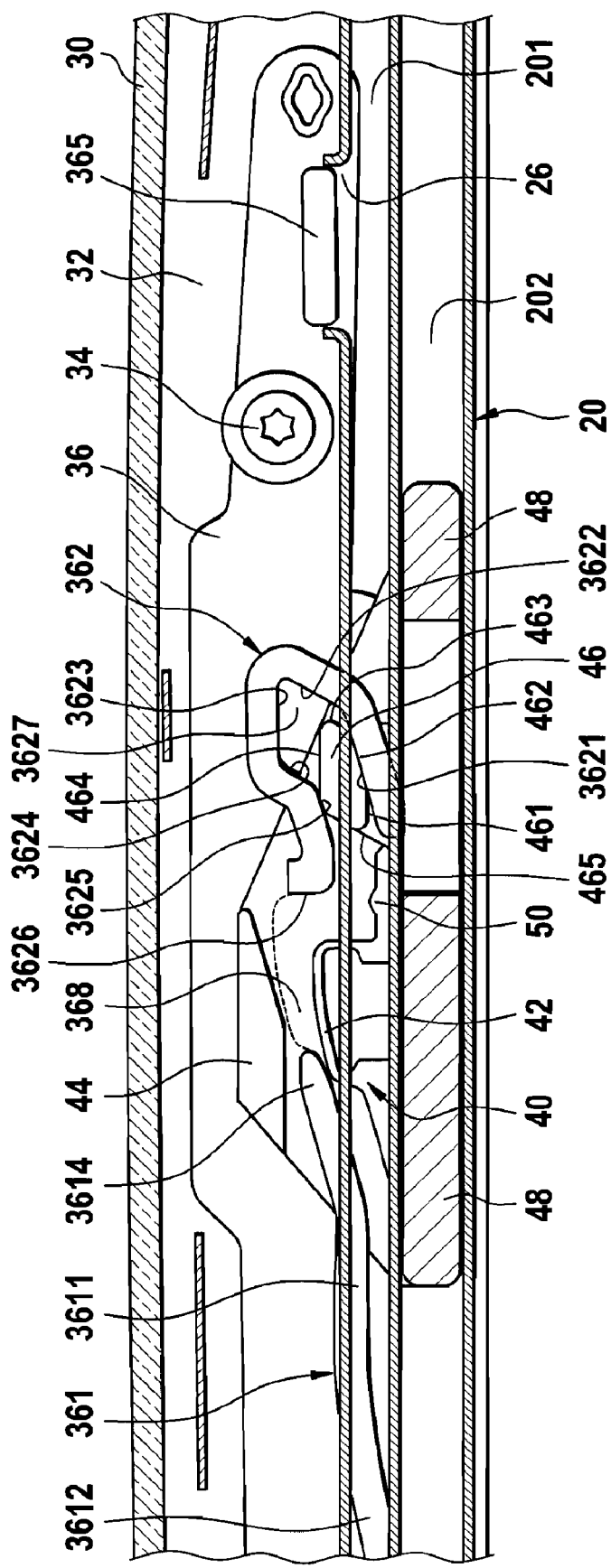
FIG. 8 shows an enlarged detailed view of the rear part of the mechanism of the cover of the first exemplary embodiment as the lowering movement of the cover rear edge progresses further.
Figure 9:
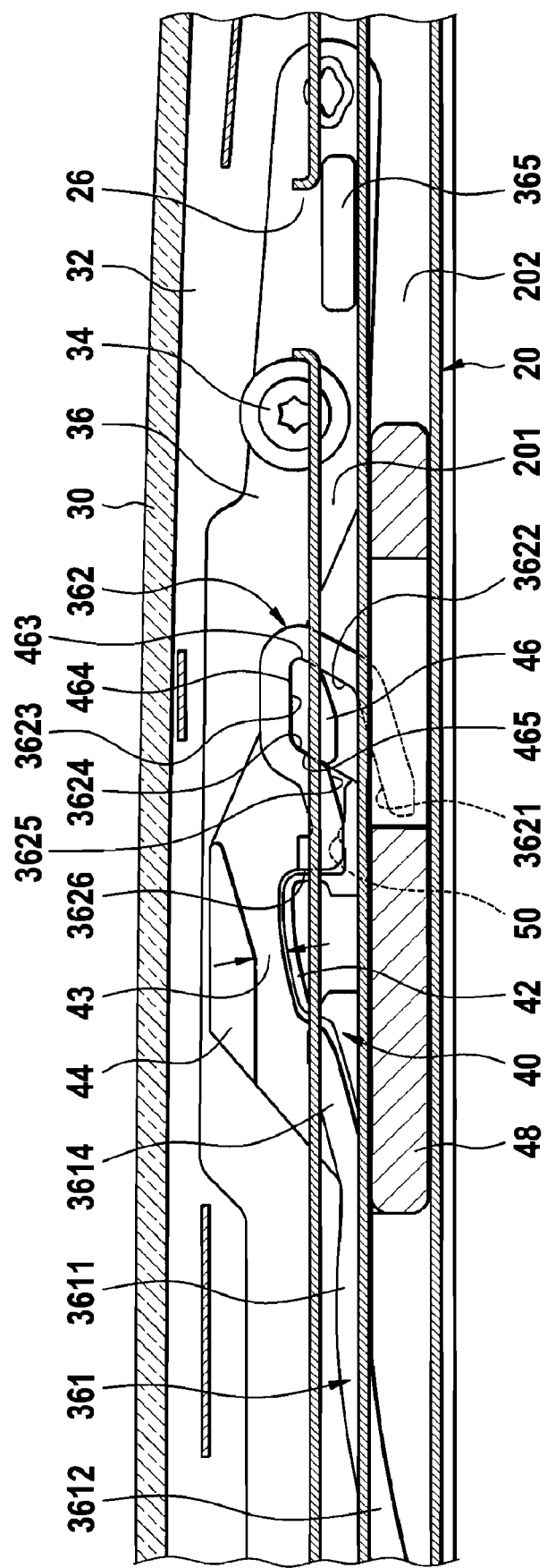
FIG. 9 shows an enlarged detailed view of the rear part of the mechanism of the cover of the first exemplary embodiment when the lowering movement of the cover rear edge is completed and the sliding displacement of the cover begins.

Upon further displacement of the driving slide 40 to the rear, the upper surface 464 of the rear second guide element 46 abuts onto the fifth section 3625 of the control slot 362 such that the cover 30 is now completely and definitely held by the rear second guide element 46 in conjunction with the control slot 362 (FIG. 8). At the same time, the lower second guide element 42 and the upper second guide element 44 are moved beyond the rear end of the web guide 361 to an extent such that they are disengaged from the web guide 361. At the same time, during the lowering movement of the cover 30, the rear control web 365 enters downward through the rear recess 26 in the guide rail 20 into the upper guide track 201 thereof.

In FIG. 9, the rear edge 302 of the cover 30 is fully lowered and the displacement of the cover to the rear under the fixed roof region 14 has already begun, as is apparent from the rear control web 365 which has already been slightly displaced with respect to the rear recess 26 in the guide rail 20. The rear second guide element 46 bears with the surface 463 thereof against the second section 3622, with the surface 464 thereof against the third section 3623 and with the surface 465 thereof against the fourth section 3624 of the control slot 362. Since, in said position, all of the control webs 363, 364 and 365 have passed downward through the recesses 22, 24 and 26 of the guide rail 20 and are now guided displaceably in the upper guide track 201 of the guide rail 20, the cover 30 is displaced to the rear by the rear second guide element in interaction with the control slot 362 upon a further movement of the driving slide 40 to the rear.

In order, in the transition from FIG. 8 to FIG. 9, upon full entry of the rear second guide element 46 into the receptacle 3627 of the control slot 362, to prevent the cover carrier 36 from striking too suddenly against the driving slide 40, the soft and elastic damping element 50 is provided on the upper side of the driving slide 40, on which the control slot 362 rests by the fifth section 3625 thereof in FIG. 9.

During the closing movement of the cover 30, the above-described sequence of movement takes place in the reverse direction. The driving slide 40 carries along the cover 30 forward until the first control web 363 strikes against the stop 28 which is provided on the front edge of the first recess 22. As a result, the cover 30 cannot be displaced further forward, and the oblique surface 465 of the rear second guide element 46 in interaction with the oblique surface on the fourth section 3624 of the control slot 362 raises the cover carrier 36 upward such that the lower second guide element 42 passes again under the rear edge of the web guide 361 and, upon further displacement of the driving slide 40 forward, engages in conjunction with the upper second guide element 44 around the web guide 361 again from the top and bottom.

The second exemplary embodiment which is illustrated in FIGS. 10 to 18 differs from the first exemplary embodiment according to FIGS. 1 to 9 in that the first guide elements arranged on the cover carrier 136, namely the web guide 1361 an the control slot 1362 are of integral and continuous design. In this case, the second guide elements which are provided on the driving slide 140 are formed only by a lower second guide element 142 and an upper second guide element 144. The lower second guide element 142 serves not only to engage around the web guide 1361 but also for engagement in the control slot 1362 during the sliding displacement movement of the cover 130.

A further difference of the second exemplary embodiment from the first exemplary embodiment is that only a front control web 1363 and a rear control web 1365 are provided as locking elements for securing the cover 130 against longitudinal displacement, said control webs respectively interacting with a front recess 122 and a rear recess 126 of the guide rail 120.

A "1" has additionally been put in front of the reference number of the other components which are identical or similar to those of the first exemplary embodiment.

The second exemplary embodiment additionally shows a water channel 137 which is present in all of the other exemplary embodiments but is not illustrated in the first exemplary embodiment and is mounted in a pivotable and longitudinally displaceable manner together with the cover 130 below the rear edge 1302 of the cover 130 by means of a pivot bearing 1371 on a slide 1372 which is displaceable in the guide rail 120. The water channel 137 is coupled pivotably in the front region thereof to the cover carrier 136 via an articulation 1373 such that said water channel, as is apparent from FIGS. 10 to 12, pivots at the same time as the cover 130 out of the closed position (FIG. 10) into the ventilation position (FIG. 11) and into the lowered position (FIG. 12).

Figure 10:
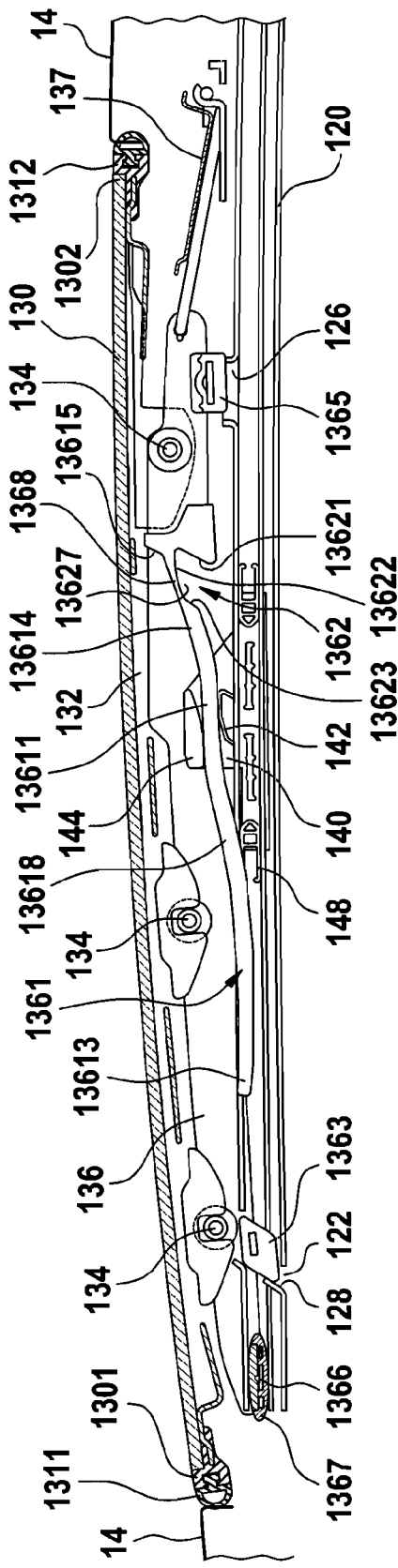
FIG. 10 shows a schematic longitudinal section according to the section line II-II in FIG. 1 through the mechanism and the guide of the cover of a second exemplary embodiment when the vehicle roof is closed.
Figure 11:
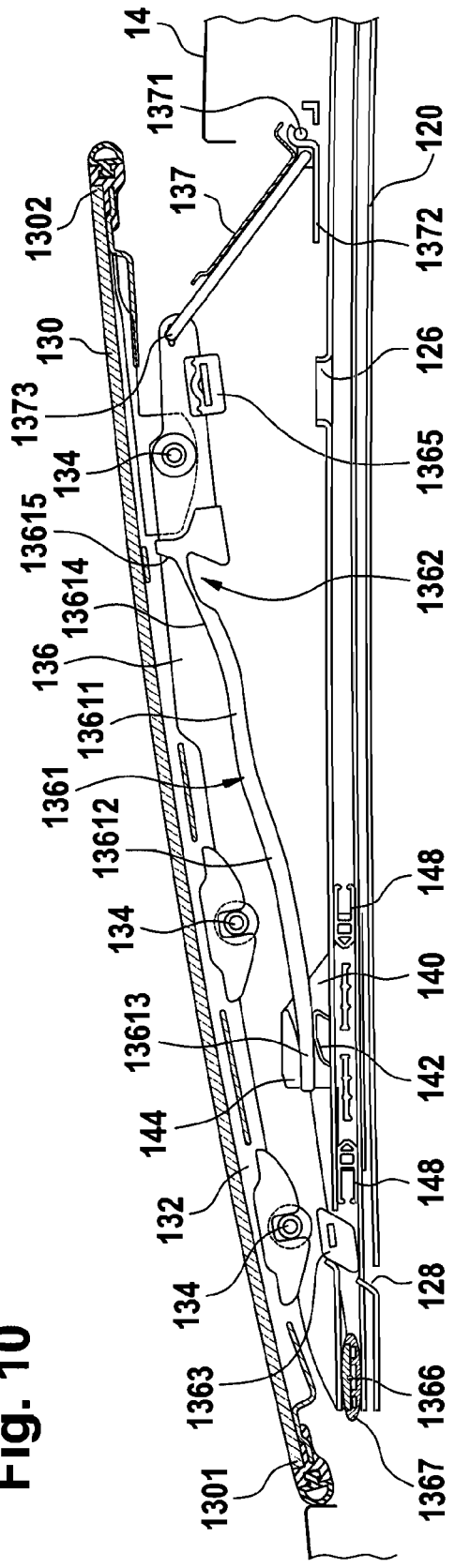
FIG. 11 shows a schematic longitudinal section through the mechanism and the guide of the cover of the second exemplary embodiment when the cover is tilted into the ventilation position.
Figures 14, 15:
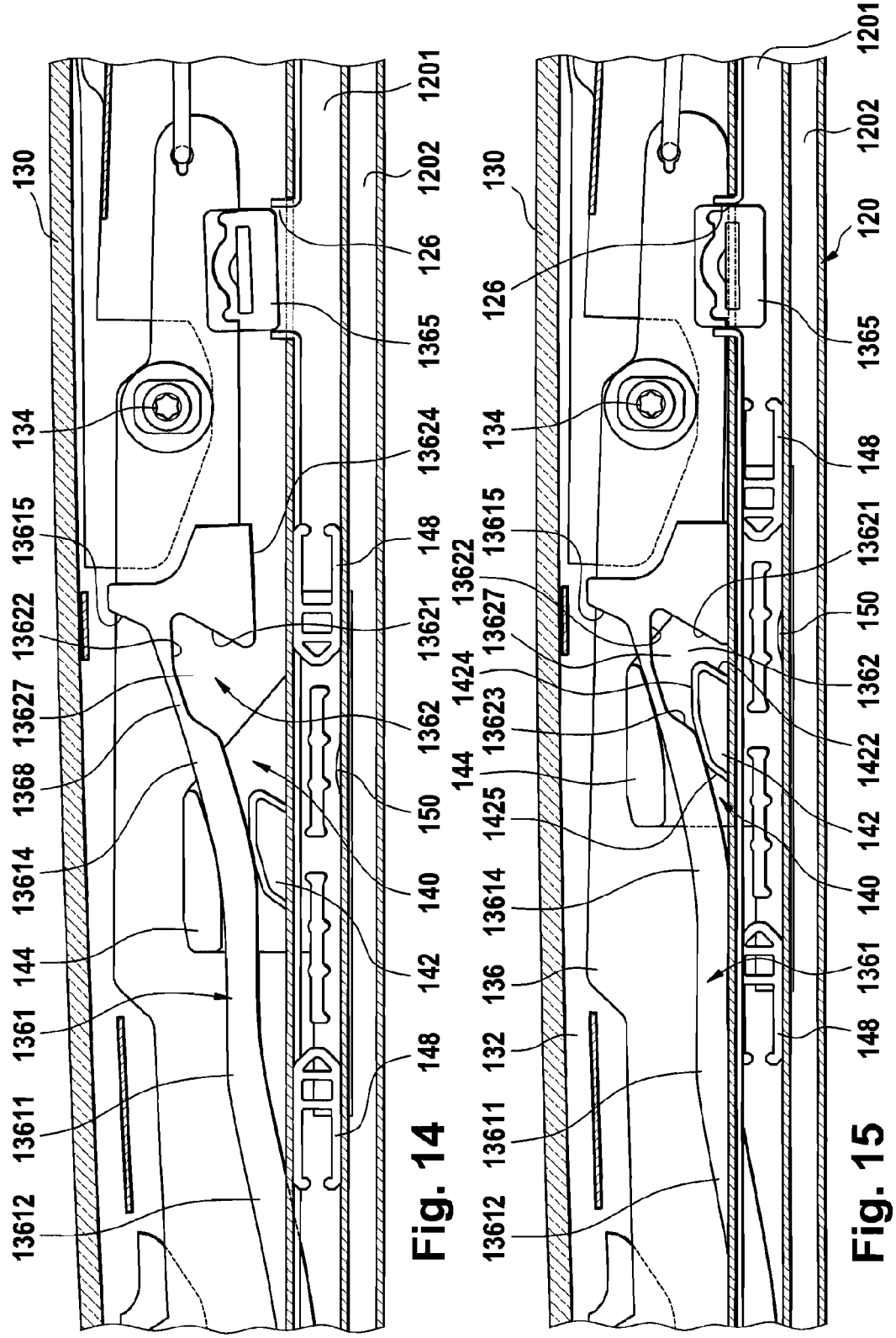
FIG. 14 shows an enlarged detailed view of the rear part of the mechanism of the cover of the second exemplary embodiment at the beginning of the lowering movement of the cover rear edge.
FIG. 15 shows an enlarged detailed view of the rear part of the mechanism of the cover of the second exemplary embodiment as the lowering movement of the cover rear edge progresses.

As in the first exemplary embodiment, the web guide 1361 has a first section 13611 which, as is apparent from FIG. 10, is arranged approximately horizontally in the closed position of the cover 130 and is engaged around by the lower second guide element 142 and by the upper second guide element 144 in said position. Those sections 13612 and 13613 of the web guide 1361 which forwardly adjoin the first section 13611 and are passed through by the second guide elements 142 and 144 during the deployment movement of the rear edge 1302 of the cover 130 are also identical to the second and third sections of the web guide 361 of the first exemplary embodiment. This also applies to the fourth section 13614 of the web guide 1361, which section rearwardly adjoins the first section 13611 and is passed through by the second guide elements 142 and 144 for the lowering movement of the rear edge 1302 of the cover 130 into the position illustrated in FIG. 12. Unlike the web guide 361 of the first exemplary embodiment, the rear end of the fourth section 13614 of the web guide 1361 is adjoined by an upwardly protruding stop 13615. The rear end of the upper second guide element 144 moves against said stop 13615 when the lowered position of the cover rear edge 1302 is reached according to FIGS. 12 and 18.

The sequence of movement during the lowering movement of the rear edge 1302 of the cover 130 in a plurality of movement phases is illustrated on an enlarged scale in FIGS. 13 to 18. In said enlarged illustration, the interaction of the second guide elements 142 and 144 with the web guide 1361 and the control slot 1362 becomes clear.

Starting from the closed position of the cover 130, which is shown in FIG. 13 and in which an upper surface 1424 of the lower second guide element 142 is placed on the first section 13611 of the web guide 1361 from below and in which a lower surface of the upper second guide element 144 is placed thereon from above, the driving slide 140, the sliding elements 148 of which are guided in this exemplary embodiment in an upper guide track 1201 of the guide rails 120, is pushed to the rear along the guide rails 120 by means of the driving cable (not illustrated). Upon further displacement to the rear (FIGS. 14 and 15), the rearwardly rising fourth section 13614 is passed through by the second guide elements 142 and 144, as a result of which the rear edge 1302 of the cover 130 is lowered to an increasing extent below the level of the rear fixed roof region 14.

Figure 18:
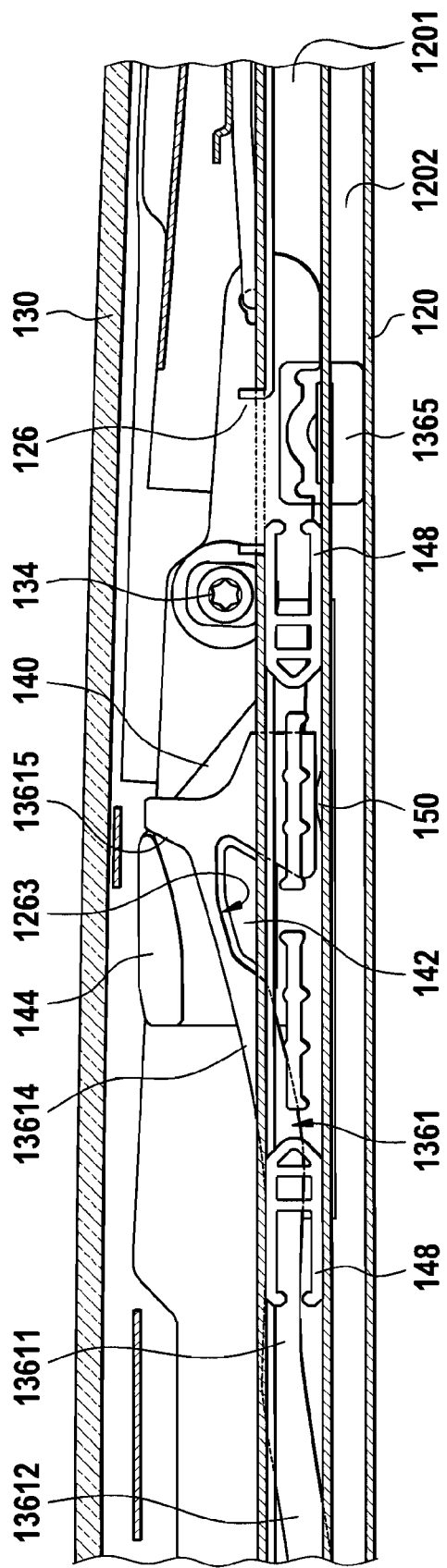
FIG. 18 shows an enlarged detailed view of the rear part of the mechanism of the cover of the second exemplary embodiment when the lowering movement of the cover rear edge is completed and the displacement of the cover begins.
Figure 19:
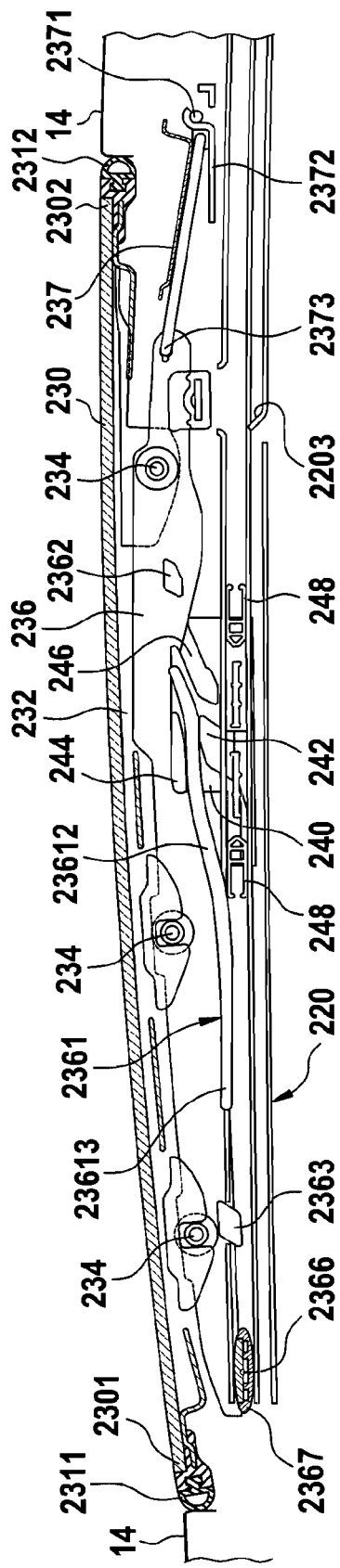
FIG. 19 shows a schematic longitudinal section according to the section line II-II in FIG. 1 through the mechanism and the guide of the cover of a third exemplary embodiment when the vehicle roof is closed.
Figure 20:
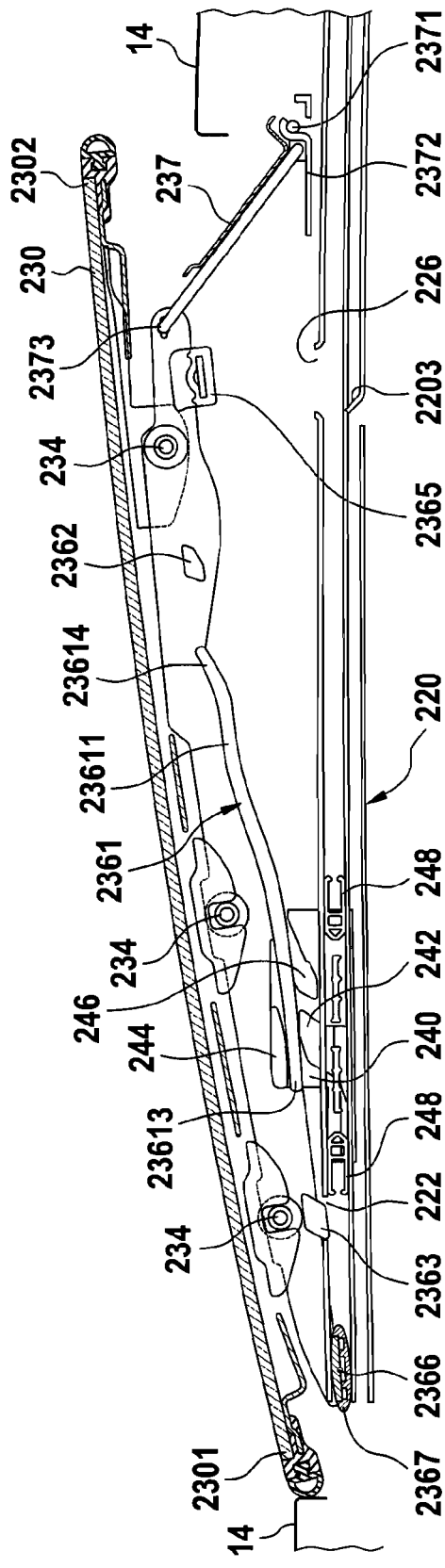
FIG. 20 shows a schematic longitudinal section through the mechanism and the guide of the cover of the third exemplary embodiment when the cover is tilted into a ventilation position.

In FIGS. 16 to 18, the transfer is managed from the web guide 1361 to the control slot 1362. As is apparent from FIG. 16, the lower second guide element 142, which is matched exactly by a rear surface 1422 rising obliquely rearward, the upper surface 1424 thereof and a surface 1425 dropping forward obliquely to the contour of the control slot 1362 with the rear first section 13621 thereof rising obliquely rearward, the upper section 13622 thereof and the front third section 13623 thereof dropping obliquely forward, is guided by the lower surface of the upper second guide element 1424 until it has entered the control slot 1362 as per FIG. 17.

The web guide 1361 has a smaller thickness in the transition region 1368 thereof arranged above the control slot 1362 and in front of the stop 13615 such that, after the lower second guide element 142 has entered the control slot 1362, the lower surface of the upper second guide element 144 no longer bears against the fourth section 13614 of the web guide 1361. However, in this position, as is apparent from FIGS. 17 and 18, the narrow, rear surface of the upper second guide element 144 bears against the stop 13615.

During the above-described lowering movement of the rear edge 1302 of the cover 130, the rear control web 1365, which is arranged on the cover carrier 136 and is designed in the form of a sliding element, is lowered at the same time. It remains in engagement with the rear recess 126 of the guide rail 120 until the rear surface 1422 of the lower second guide element 142 bears against the rear first section 13621 of the control slot 1362 (see FIGS. 16 and 17). When the lower second guide element 142 has fully entered the control slot 1362, the rear control web 1365 is also lowered to an extent such that it has entered downward through the rear recess 126 into the lower guide track 1202 of the guide rail 120 (see FIG. 18). The same also applies to the front control web 1363 and the interaction thereof with the front recess 122 of the guide rail 120 (see FIG. 12).

Starting from the lowered position of the cover 130 illustrated in FIGS. 12 and 18, said cover is subsequently displaced to the rear under the fixed roof region 14, as a result of which the roof opening 18 is partially or fully exposed. The cover 130 is displaced in said region by the lower second guide element 142 engaging in the control slot 1362.

To close the cover 130, the sequence of movement takes place in the reverse sequence. When the driving slide 140 is displaced forward, the front control web 1363 strikes against the stop 128. In said position, the front control web 1363 is located exactly below the front recess 122 and the rear control web 1365 is located exactly below the rear recess 126 in the guide rail 120. Since, in said position, a further displacement forward is prevented by the stop 128, the front oblique surface 1425 of the lower second guide element 142 presses against the oblique surface 13623 of the control slot 1362, as a result of which the cover 130 is moved upward again at the rear edge 1302 thereof. As soon as the lower second guide element 142 has emerged again forward out of the control slot 1362, the upper surface 1424 of said guide element in conjunction with the lower surface of the upper second guide element 144 takes over the further pivoting movement of the cover 130.

The mechanism shown in the second exemplary embodiment is of particularly simple construction since the web guide 1361 and control slot 1362 can be designed as a single part and, as a result, a transfer to bridge a gap between said two first guide elements is unnecessary. The driving slide 140 is also of simpler construction than in the first exemplary embodiment, since only two guide elements 142 and 144 are provided thereon, of which the lower second guide element 142 has a dual function: firstly engaging around the web guide 1361 in interaction with the upper second guide element 144 for the pivoting movements of the cover 130 and secondly engaging in the control slot 1362 for displacement of the cover 130.

The third exemplary embodiment which is illustrated in FIGS. 19 to 26 differs from the first exemplary embodiment according to FIGS. 1 to 9 and from the second exemplary embodiment according to FIGS. 10 to 18 in that the first guide elements arranged on the cover carrier 236 are designed as a web guide 2361 and as a control cam 2362 while, in this case, the second guide elements which are provided on the driving slide 240 are formed by a lower second guide element 242, an upper second guide element 244 and a control slot 246. In this case, the lower second guide element 242 and the upper second guide element 244 serve to engage around the web guide 2361 while the control slot 246 serves for engagement of the control cam 2362 during the displacement movement of the cover 230.

As in the second exemplary embodiment, the locking elements for securing the cover 230 against longitudinal displacement are formed only by a front control web 2363 and by a rear control web 2365 which respectively interact with a front recess 222 and a rear recess 226 of the guide rail 220.

A "2" is placed in front of the reference number of the remaining components which are identical or similar to those of the first or second exemplary embodiment.

In the third exemplary embodiment, in a similar manner to the first exemplary embodiment, during the transition from the lowering movement of the rear edge 2302 of the cover 230 to the displacement movement of the cover 230, the cover 230 is transferred from being guided by the lower second guide element 242 and the upper second guide element 244 in interaction with the web guide 2361 to the cover 230 being guided by the control cam 2362 in interaction with the control slot 246. Said transition is illustrated on an enlarged scale in FIGS. 22 to 26. Starting from the closed position of the cover 230, which is illustrated in FIG. 22 and in which the lower second guide element 242 and the upper second guide element engage around the web guide 2361 in the first guide section 23611 thereof, the driving slide 240 moves to the rear, i.e. to the right in the figures, for the lowering movement of the rear edge 2302 of the cover 230.

As soon as the lower second guide element 242 and the upper second guide element 244 according to FIG. 23 have reached the fourth section 23614 of the web guide 2361, the guide cam 2362 enters a rearwardly and upwardly open guide channel of the control slot 246, which guide channel runs obliquely forward and downward. Said guide channel is bordered by a lower guide surface 2464 rising obliquely rearward and by an upper guide surface 2465 which is arranged at a distance from and parallel to said guide surface 2464 and rises obliquely rearward.

The guide cam 2362 has a first guide surface 23621 dropping obliquely forward, an approximately horizontally arranged, second guide surface 23622 on the lower side thereof, a third guide surface 23623 rising obliquely rearward, a fourth guide surface 23624 which rearwardly adjoins the latter and rises more steeply rearward, and an approximately horizontal, upper guide surface 23625. The first guide surface 23621 and the fourth guide surface 23624 are arranged approximately parallel to each other. The second lower guide surface 23622 and the upper guide surface 23625 of the guide cam 2362 are likewise arranged approximately parallel to each other.

When the guide cam 2362 enters the control slot 246 according to FIG. 23, the third guide surface 23623 bears against the lower guide surface 2464 of the control slot 246 and the rounded edge located between the first guide surface 23621 and the upper guide surface 23625 of the guide cam 2362 bears against the upper guide surface 2465 of the control slot 246.

Figure 25:
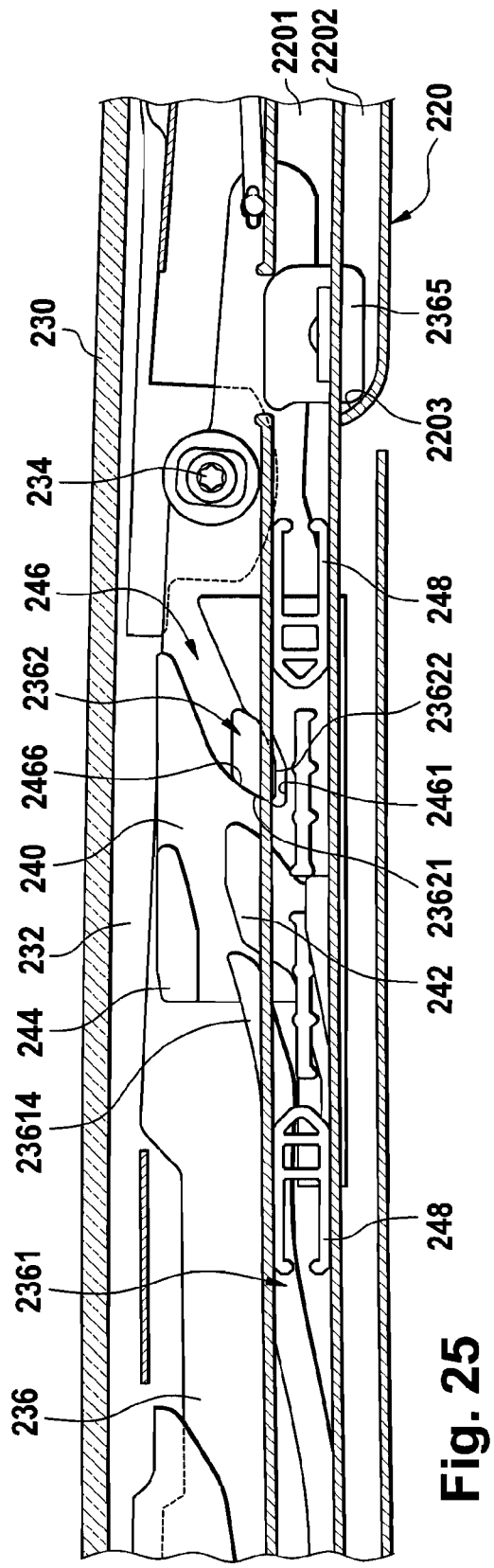
FIG. 25 shows an enlarged detailed view of the rear part of the mechanism of the cover of the third exemplary embodiment as progresses further
Figure 26:
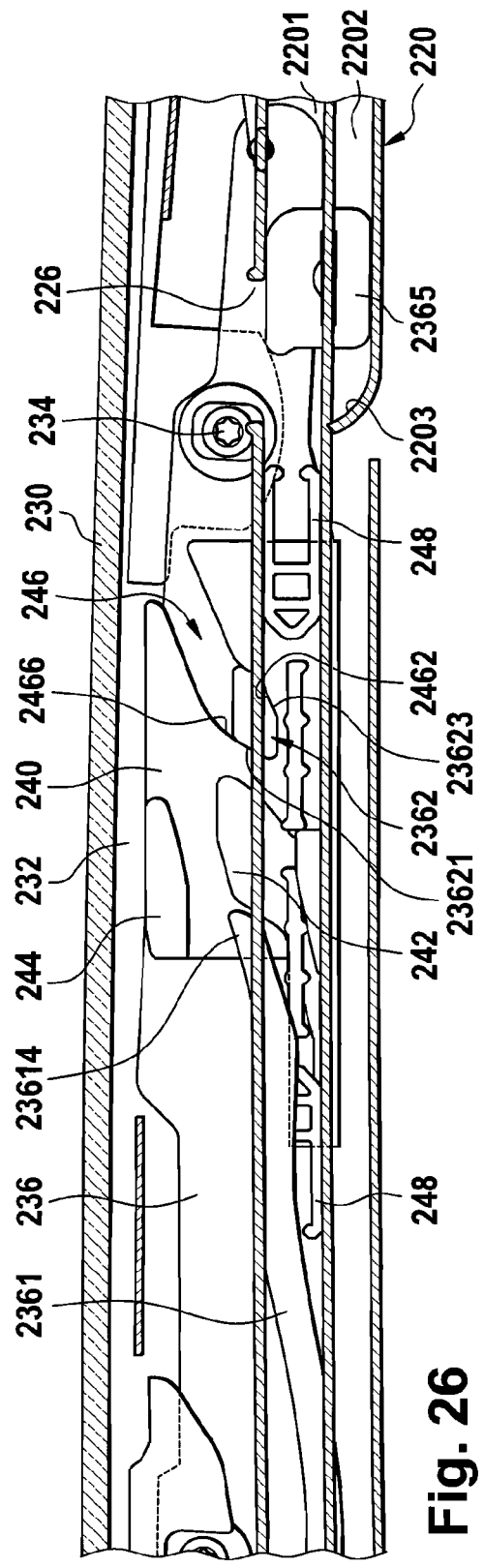
FIG. 26 shows an enlarged detailed view of the rear part of the mechanism of the cover of the third exemplary embodiment when the lowering movement of the cover rear edge is completed and the displacement of the cover begins.

Upon further movement of the driving slide 240 to the rear according to FIGS. 24 to 26, the guide cam 2362 is moved further downward by the obliquely downwardly running guide channel of the control slot 246, thus resulting at the same time in a further lowering movement of the rear edge 2302 of the cover 230. At the same time, the locking elements, of which only the rear control web 2365 is shown in FIGS. 22 to 26, are also moved ever further downward through the recesses 222 and 226 of the guide rail 220.

At the same time as the guide cam 2362 enters the lower, more steeply inclined guide channel of the control slot 246 which guide channel is defined by a front section 2466, a lower section 2461 and a rear section 2463, the lower second guide element 242 and the upper second guide element 244 stop being in engagement with the control web 2361. Upon complete engagement of the guide cam 2362 in the control slot 246 (FIG. 26), the lower second guide element 242 is located with a front surface rising obliquely rearward just behind the rear end of the fourth section 23614 of the control web 2261. The position according to FIG. 25 marks the beginning of the displacement of the cover 230 to the rear under the fixed vehicle roof 14. In FIG. 26, the cover 230 has already been displaced by a small amount to the rear, as can easily be seen from the position of the control web 2365 with respect to the rear edge of the recess 226 in the guide rail 220.

For the closing, the sequence of movement takes place in the reverse sequence. As soon as the driving slide 240, when moving forward, has reached the position illustrated in FIG. 25, the rear control web 2365 moves against the stop 2203 which is formed on the lower guide surface of the lower guide track 2202 of the guide rail 220. As a result, the control web 2365 is inevitably moved upward into the recess 226. As a result, upon further movement of the driving slide 240 forward, the cover 230 can no longer be taken along any further forward. The engagement of the control cam 2362 in the control slot 246 and, shortly thereafter, the sliding of the oblique, front guide surface on the lower second guide element 242 down along the rear, obliquely downwardly inclined guide surface of the control web 2361 cause the cover rear edge 2302 to be raised in the direction of the closed position according to FIG. 19 and, upon further movement of the driving slide 240 forward, to be raised further into the ventilation position according to FIG. 20. In the fourth exemplary embodiment according to FIGS. 27 to 31, in a similar manner to the second exemplary embodiment according to FIGS. 10 to 18, there are only two second guide elements 342 and 344 on the driving slide 340, said guide elements engaging around the guide web 3361. The control slot 3362 is formed by a guide channel which is located between the rear end of the control web 3361 and a control cam 33620 which is arranged behind the control web 3361 at a distance therefrom.

Adjoining the rear end of the fourth guide section 33614, the control web 3361 has a guide surface 33624 which drops obliquely forward and downward and forms the front part of the control slot 3362. The rear part of the control slot 3362 is formed by a lug-shaped, lower first section 33621, a second guide section 33622 which adjoins the latter and rises obliquely rearward, and a third guide section 33623, which upwardly adjoins the latter and rises more steeply rearward, of the control cam 33620.

The lower second guide element 342 has a surface 3425 rising obliquely rearward on the front side thereof, an approximately horizontal guide surface 3424 on the upper side thereof and a guide surface 3422 dropping obliquely forward at the rear end thereof.

In the fourth exemplary embodiment, the lower second guide element 342 has a dual function. It firstly engages with the upper guide surface 3424 of the upper second guide element 344 around the web guide 3361 in the closed position of the cover 330 and during the pivoting movements thereof. Secondly, the lower second guide element 342 engages in the guide slot 3362 during displacement of the cover 330.

It becomes clear from FIGS. 27 to 31 that the lower second guide element 342 is continuously in engagement with the control web 3361 and the guide slot 3362 such that, in this exemplary embodiment—in a similar manner as in the second exemplary embodiment—transfer to other guide elements does not have to take place.

As is apparent from FIGS. 28 and 29, the fourth section 33614 of the control web 3361 is guided between the lower second guide element 342 and the upper second guide element 344 until the lower second guide element 342 has entered the guide channel of the control slot 3362 to such an extent that said guide element bears with the rear guide surface 3422 thereof against the guide surface 33623 of the control cam 33620 and with the front guide surface 3425 thereof against the front guide surface 33624 of the control slot 3362.

After the rear edge of the cover 330 has been fully lowered, the upper second guide element 344 is at a distance above the rear end of the control web 3361 while the lower second guide element 342 has entered the guide slot 3362 to such an extent that the upper guide surface 3424 of said guide element approximately forms an extension of the fourth section 33614 of the control web 3361 to the rear. In this case, the rear end of the cover 330 is lowered until the rear control web 3365 has completely passed downward through the rear recess 326 of the guide rail 320 and subsequently, upon displacement of the cover 330 to the rear, is guided in the lower guide track 3202 of the guide rail 320.

The transition from a sliding displacement of the cover 330 into a pivoting movement of the cover 330 during a movement in the opposite direction in order to close the cover 330 is controlled again by the stop 3203 on the lower guide track 3202 of the guide rail 320 in interaction with the rear control web 3365. By means of the stop 3203, the control web 3365 is pressed upward into the recess 326 of the guide rail 320. Since the cover 330 can now no longer be displaced any further forward, upon further displacement of the driving slide 340 forward—by the lower guide element 342 sliding forward and downward in the control slot 3362—said cover is pivoted upward. As soon as the upper guide surface 3424 of the lower second guide element 342 engages around the control web 3361 again from the lower side thereof, the lower guide surface of the upper second guide element 344 is also again in contact with the upper guide surface of the control web 3361.

The remaining reference numbers of the fourth exemplary embodiment that have not been mentioned individually in the preceding description of the figures correspond to those of the first three exemplary embodiments, in which the leading number is formed by a "3". Although the figures for the fourth exemplary embodiment do not contain an overall view, it is clear to a person skilled in the art that the front parts (not shown) of the mechanism correspond to those of the other exemplary embodiments.

It goes without saying for a person skilled in the art that the mechanisms described above only for one side of the roof and in the singular are preferably provided on both sides of the roof opening 18 or of another vehicle opening symmetrically with respect to a central longitudinal plane.

By means of the combination of a web guide which is known per se and a slotted guide which is known per se, said combination being effective successively in different movement phases of the cover, the invention has created a particularly simple mechanism of a body component, in particular of a tilt and slide roof, which mechanism can be produced easily and cost-effectively and consists of few parts and in which any additional deployment lever or locking lever can be completely dispensed with.

All of the movement sequences are brought about directly and exclusively by the displacement of the driving slide in the guide rail, and therefore the mechanism according to the invention permits a particularly simple, cost-effective, robust, very substantially play-free, low-wearing and low-noise movement of a body component and in particular of a cover of a tilt and slide roof.

The invention claimed is:

1. A mechanism for producing pivoting movements and sliding movements of a body component, with a displaceable slide which is in engagement with at least one first guide element arranged on the body component by means of at least one second guide element, wherein the displaceable slide is provided with at least two second guide elements which interact with the first guide element in the closed position and during the pivoting movements of the body component, and which interact with a further first guide element assigned to the body component upon a displacement movement of the body component, characterized in that at least one some of the second guide elements become disengaged from the first guide element designed as a web guide while at least one of the second guide elements is in engagement with the further first guide element.

2. The mechanism of claim 1, characterized in that one further first guide element is designed as a control slot.

3. The mechanism of claim 1, characterized in that at least one locking element blocking the displacement movement of the body component in the closed position thereof and during the pivoting movements thereof is arranged on the body component or on a component assigned to the body component.

4. The mechanism of claim 1, characterized in that the slide is displaceable along a guide rail which has at least one recess for the engagement or the passage of the locking element.

5. The mechanism of claim 1, characterized in that the first guide elements and/or the locking element are at least partially formed integrally on the body component or on a component arranged on the body component.

6. The mechanism of claim 1, characterized in that the second guide elements are at least partially formed integrally with the slide.

7. The mechanism of claim 1, characterized in that a gap or a transition region which is thinner than the rest of the thickness of the web guide is provided in the longitudinal direction between the first guide element designed as a web guide and the further first guide element designed as a control slot.

8. The mechanism of claim 1, characterized in that the locking element is formed by a plurality of control webs which are spaced apart from one another in the longitudinal direction and respectively interact with a recess on the guide rail.

9. The mechanism of claim 1, characterized in that a rear control web is arranged behind the first guide elements.

10. The mechanism of claim 1, characterized in that at least one front control web is arranged behind the first guide elements.

11. The mechanism of claim 8, characterized in that, upon sliding displacement of the body component the control webs are guided in a first guide track of the guide rail while sliding elements provided on the slide are guided in another guide track of the guide rail.

12. The mechanism of claim 1, characterized in that a damping element is arranged on a surface of the slide, said surface facing the body component.

13. The mechanism of claim 1, characterized in that the first guide elements are formed by a web guide and a control slot directly adjoining the rear end thereof.

14. The mechanism of claim 13, characterized in that one of the second guide elements is always continuously in engagement with the web guide or with the control slot.

15. The use of a mechanism of claim 1 wherein the body component is a tilting and sliding cover for an opening on a roof of a vehicle.

* * * * *